(12) United States Patent
Saab

(10) Patent No.: US 9,986,678 B2
(45) Date of Patent: Jun. 5, 2018

(54) METHODS TO DIFFERENTIATE AND IMPROVE GERMPLASM FOR SEED EMERGENCE UNDER STRESS

(71) Applicant: PIONEER HI-BREED INTERNATIONAL, INC., Johnston, IA (US)

(72) Inventor: Imad N. Saab, Johnston, IA (US)

(73) Assignee: PIONEER HI-BRED INTERNATIONAL, INC. IA (US)

(*) Notice: Subject to any disclaimer, the term of this patent is extended or adjusted under 35 U.S.C. 154(b) by 279 days.

(21) Appl. No.: 14/424,867

(22) PCT Filed: Aug. 28, 2013

(86) PCT No.: PCT/US2013/057062
§ 371 (c)(1),
(2) Date: Feb. 27, 2015

(87) PCT Pub. No.: WO2014/036128
PCT Pub. Date: Mar. 6, 2014

(65) Prior Publication Data
US 2015/0208572 A1 Jul. 30, 2015

Related U.S. Application Data

(60) Provisional application No. 61/694,960, filed on Aug. 30, 2012, provisional application No. 61/782,911, filed on Mar. 14, 2013.

(51) Int. Cl.
*A01C 1/00* (2006.01)
*A01C 1/02* (2006.01)

(52) U.S. Cl.
CPC ............... *A01C 1/025* (2013.01); *A01C 1/02* (2013.01)

(58) Field of Classification Search
CPC .................................. A01C 1/02; A01C 1/025
(Continued)

(56) References Cited

U.S. PATENT DOCUMENTS

| | | | | | |
|---|---|---|---|---|---|
| 4,230,983 A | * | 10/1980 | Steere | ..................... | G01N 27/07 324/71.1 |
| 4,237,651 A | * | 12/1980 | Caballero | .............. | A01G 31/00 47/14 |
| 4,467,560 A | * | 8/1984 | Simak | ...................... | A01C 1/00 209/11 |
| 4,975,364 A | * | 12/1990 | Taylor | .................... | G01N 33/48 435/29 |
| 5,129,180 A | * | 7/1992 | Stewart | .................... | A01C 1/06 427/4 |
| 6,080,950 A | * | 6/2000 | Jalink | .................... | A01C 1/025 209/576 |

(Continued)

FOREIGN PATENT DOCUMENTS

| | | |
|---|---|---|
| DE | 2615154 A1 | 12/1976 |
| EP | 0364952 A2 | 4/1990 |

(Continued)

OTHER PUBLICATIONS

Association of Official Seed Analysts—Rules for Seed Testing 2010, Publication of the Association of Official Seed Analysts, Inc., Ithaca, NY 14850, USA.

(Continued)

*Primary Examiner* — David J Parsley
*Assistant Examiner* — Danielle A Clerkley

(57) ABSTRACT

The present invention provides methods for testing seed germination and predicting seed emergence in stressful field conditions, such as cold and flooding stress. Cold Soak Test and ultra-drying methods are provided herein. The methods find use in the development of corn breeding technologies and germplasm selection to evaluate and develop new hybrids that can produce stable stands under stressful field conditions.

17 Claims, 11 Drawing Sheets

(58) Field of Classification Search
USPC .................................................. 47/14
See application file for complete search history.

(56) References Cited

U.S. PATENT DOCUMENTS

| | | | | |
|---|---|---|---|---|
| 6,195,936 | B1* | 3/2001 | Soll | A01C 1/02 47/57.6 |
| 9,049,813 | B2* | 6/2015 | Notten | A01C 1/00 |
| 2004/0055211 | A1* | 3/2004 | Lestander | A01C 1/025 47/14 |
| 2004/0241635 | A1* | 12/2004 | Buckley | A01C 1/00 435/4 |
| 2005/0272605 | A1* | 12/2005 | Bradley | A01N 59/00 504/100 |
| 2010/0130365 | A1* | 5/2010 | Notten | A01C 1/00 504/138 |
| 2010/0186297 | A1* | 7/2010 | Van Duijn | A01C 1/02 47/1.01 R |
| 2011/0041400 | A1* | 2/2011 | Trias Vila | A01C 1/02 47/58.1 SE |
| 2012/0005773 | A1* | 1/2012 | Aasen | C12N 15/8261 800/275 |

FOREIGN PATENT DOCUMENTS

| | | |
|---|---|---|
| EP | 2140749 A1 | 1/2010 |
| GB | 2163634 A | 3/1986 |
| WO | 97/42489 A1 | 11/1997 |

OTHER PUBLICATIONS

Association of Official Seed Analysts, 2002, Seed Vigor Testing Handbook, AOSA, Stillwater, OK.
Rhonda Brooks, Germination Testing Shows Seed Corn Quality, Vigor, Farm Journal Magazine, Jan. 30, 2012.
J. S. Burris et al., Relationship Between Laboratory Cold-Test Methods and Field emergence in maize Inbreds, Agronomy Journal, pp. 985-988, Nov.-Dec. 1979, vol. 71.
J. P. Cal et al., Differential Growth of Corn (*Zea mays* L.) Hybrids Seeded at Cold Root Zone Temperatures), Crop Science, Sep.-Oct. 1972, pp. 572-575, vol. 12.
J. P. Cal et al., Imbibitional Chilling Injury in *Zea mays* L. Altered by Initial Kernel Moisture and Maternal Parent, Crop Science, May-Jun. 1972, pp. 369-373, vol. 12.
B. E. Clark, Relationship between certain laboratory tests and the field germination of sweet corn. Proc. Assoc. Off. Seed Anal., 1953, pp. 42-44.
Mark Alan Cohn et al., Relationship of Stelar Lesions to Radicle Growth in Corn Seedlings, Agronomy Journal, Nov.-Dec. 1979, Agronomy Journal, pp. 954-958, vol. 71.
CSA News, Against the Clock—Stress emergence in early-season corn planting, Apr. 209, 4 pages, vol. 54, No. 4.
International Rules for Seed Testing, 2010, The International Seed Testing Association, Basserdorf, CH-Switzerland.
Iowa State University Seed Testing Laboratory—"Testing Methods"; www.seedab.iastate.edu/testing-methods—Webpage Citation Provided.
B. A. Martin et al., Relationships between Laboratory Gemination Tests and Field Emergence of Maize Inbreds, Crop Science, Sep.-Oct. 1988, pp. 801-805, vol. 28.
Imad Saab et al., Diagnosing Chilling and Flooding Injury to Corn Prior to Emergence, Crop Insights, 2004, pp. 1-4, vol. 14, No. 4.
McCormack, Jeffrey H., Seed Processing and Storage: Principles and Practices, Dec. 28, 2004, pp. 1-28, Version 1.3 (www.carolinafarmstewards.org/wp-content/uploads/2012/05/SeedProcessingandStorageVer_1pt3.pdf).
Mukti Sing et al., Corn Moisture Meter Comparisons to the Air Oven in Illinois, Conference Paper No. 03-6003, Jan. 2003 (Abstract Only).
Tara T. Van Toai, Filed Performance of Abscisic Acid-Induced Flood-Tolerant Corn, Crop Science, Mar.-Apr. 1993, pp. 344-346, vol. 33.
Robert D. Wych, Production of Hybrid Seed Corn, Corn and Corn Improvement—Agronomy Monograph, 1988, pp. 565-607, No. 18, $3^{rd}$ edition.
Guant-Hua Zheng et al., Ultradry seed storage cuts cost of gene bank, Nature, May 21, 1998, pp. 223-224, vol. 393.
C. Zhu et al., Changes in Sugars during Rice Seed Desiccation, Russian Journal of Plant Physiology, 2006, pp. 198-204, vol. 53, No. 2.
www.michcrop.com/seedtesting.asp—"Seed Testing"—Webpage Citation Provided.
www.psrcorn.com/seed-testing.html—Seed Testing—Webpage Citation Provided.
seedlab.oregonstate.edu/importance-seed-vigor-testing—Oregon State Seed Laboratory—Seed Laboratory—Webpage Citation Provided.
www.sgs.com/en/agriculture-food/seed-and-crop/seed-services/standard-germination-tests—Webpage Citation Provided—Agriculture and Food—Standard Germination Test.
www.analyzeseeds.com/publications/—Association of Official See Analysts/Society of Commercial Seed Technologies; AOSA Seed Testing Rules & Handbook.
International Search Report—PCT/US2013/057062—dated Nov. 29, 2013.
Written Opinion—PCT/US2013/057062—dated Nov. 29, 2013.

* cited by examiner

FIG. 2-A
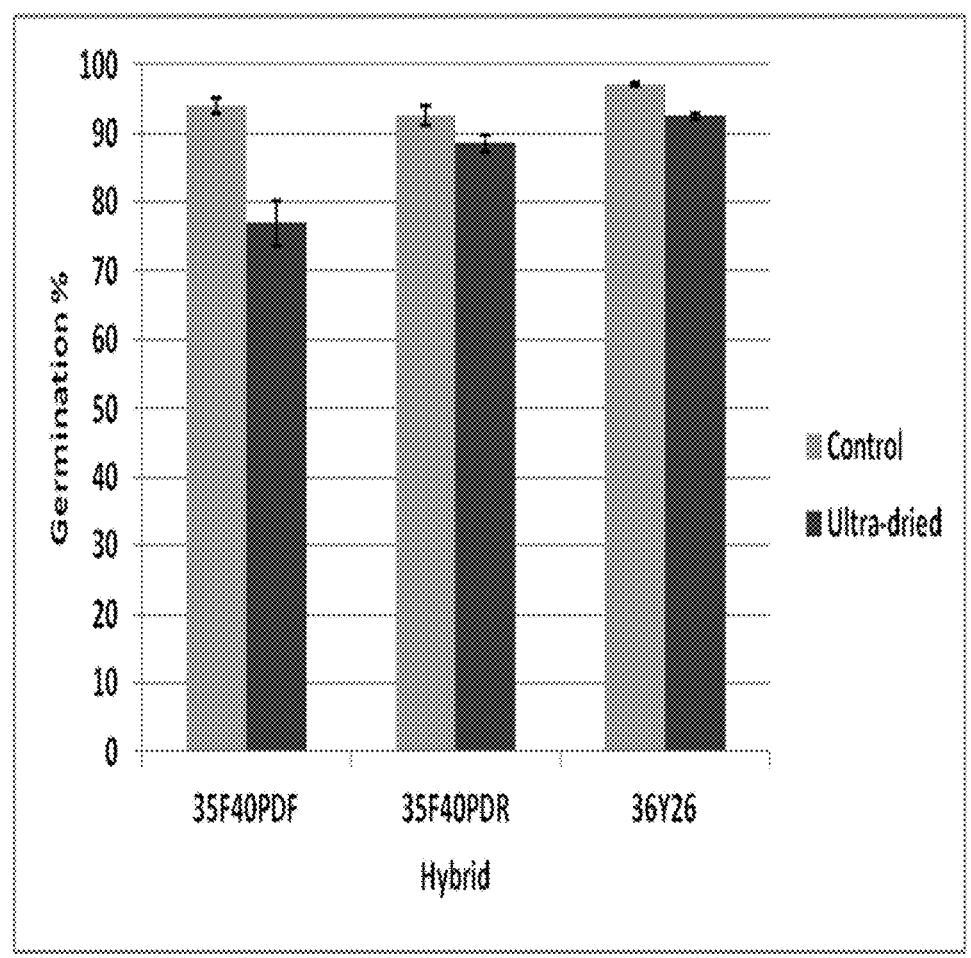

FIG. 2-B
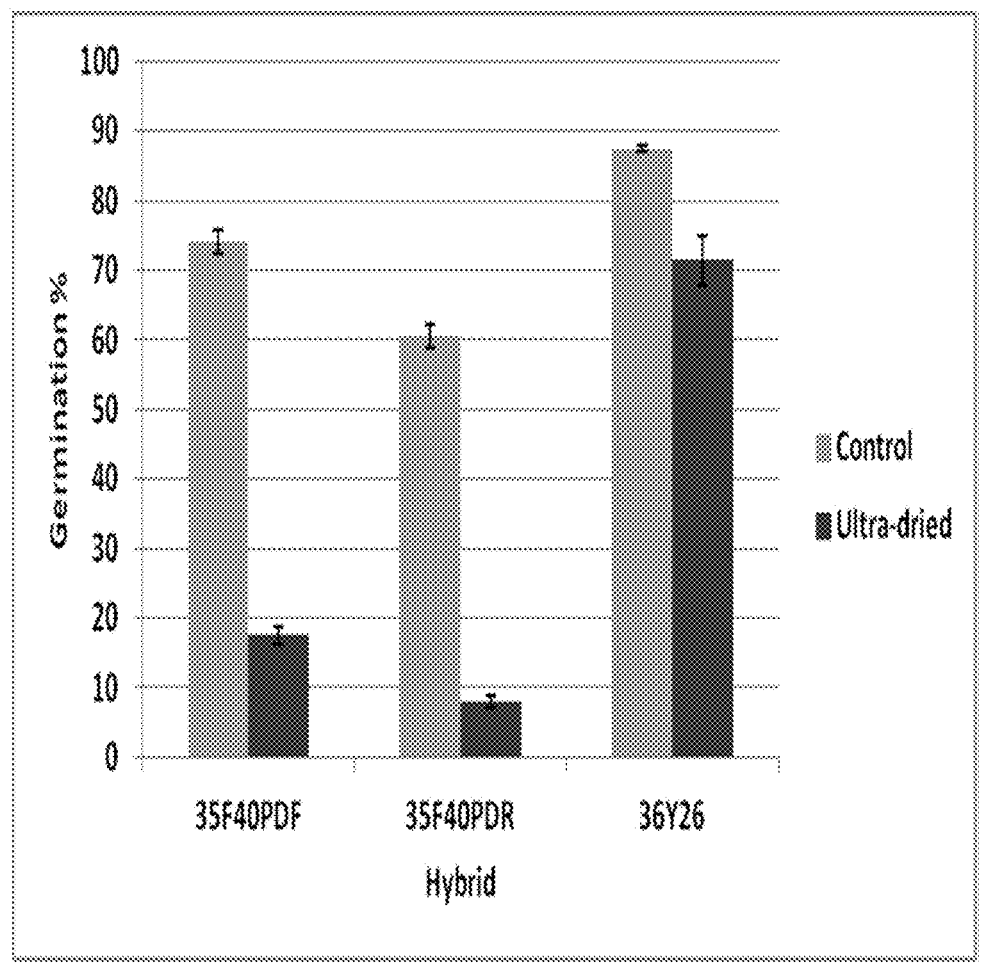

FIG. 4-A
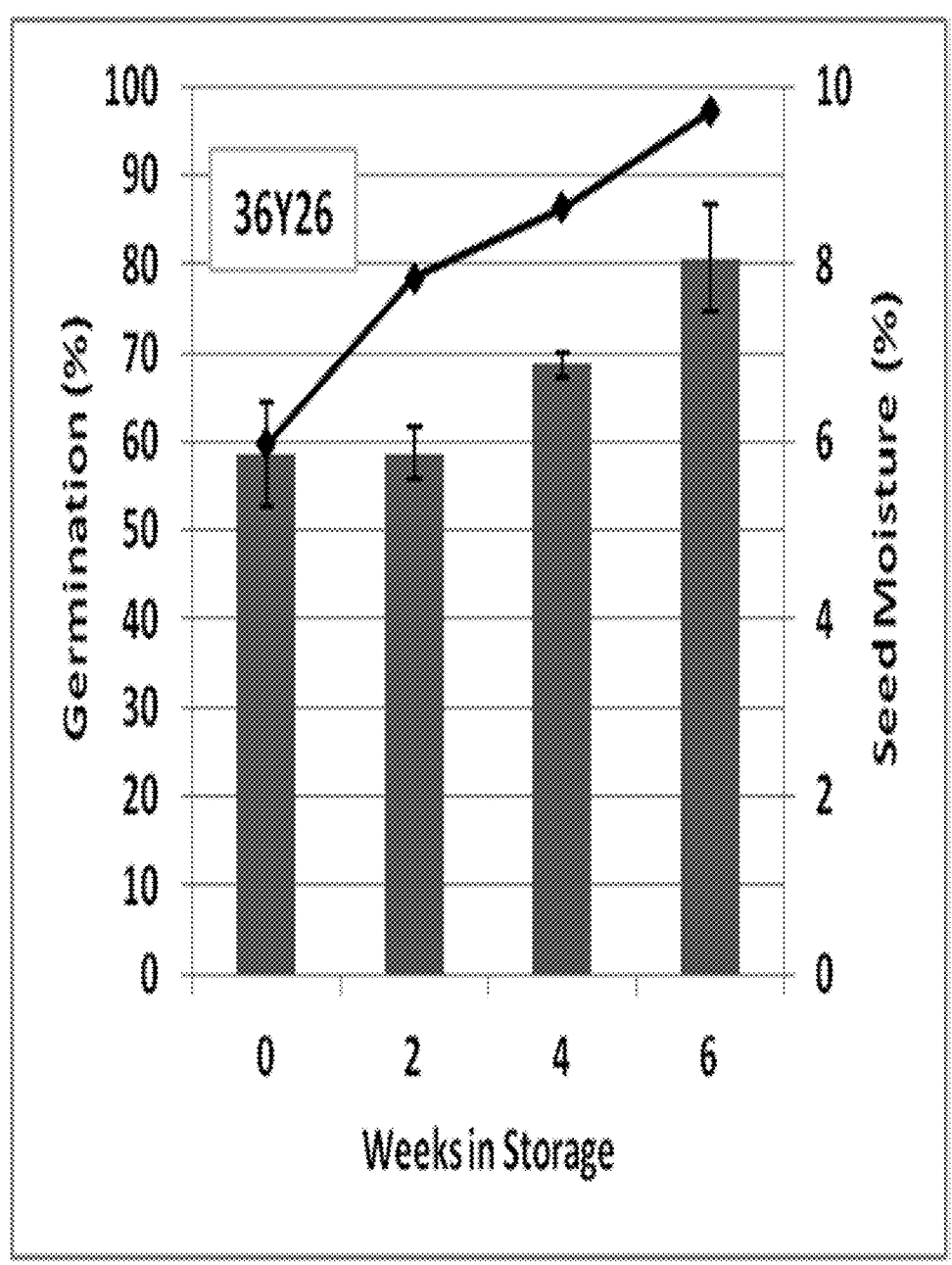

FIG. 4-B
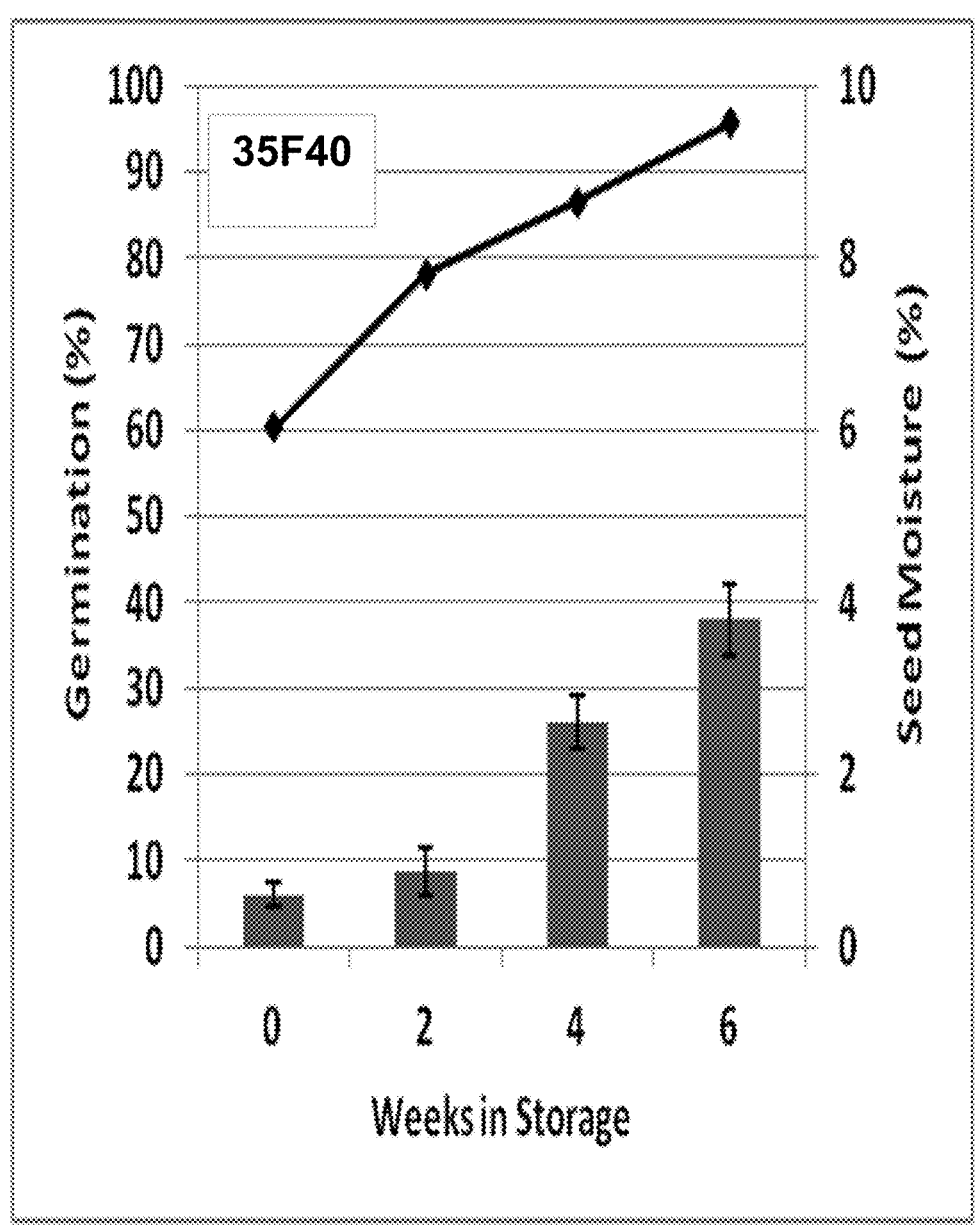

FIG. 5-A
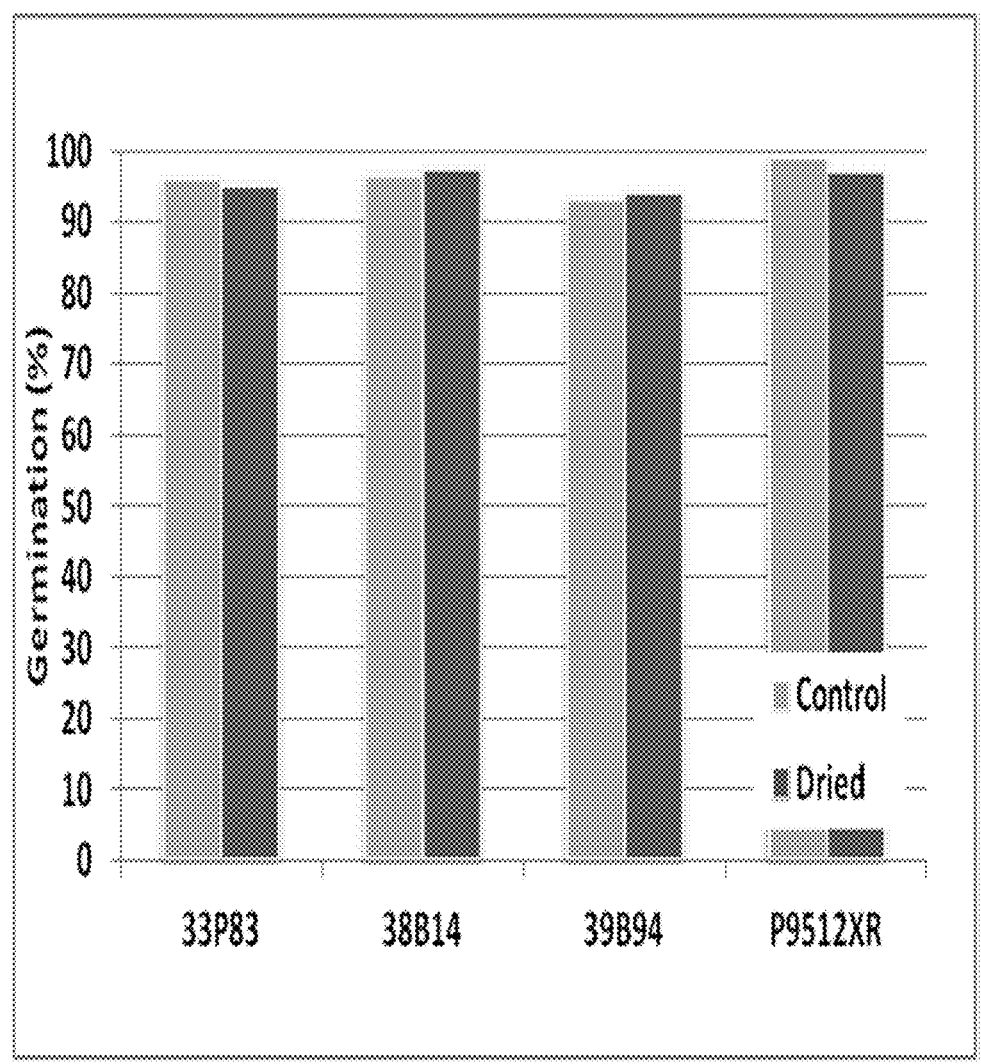

FIG. 5-B
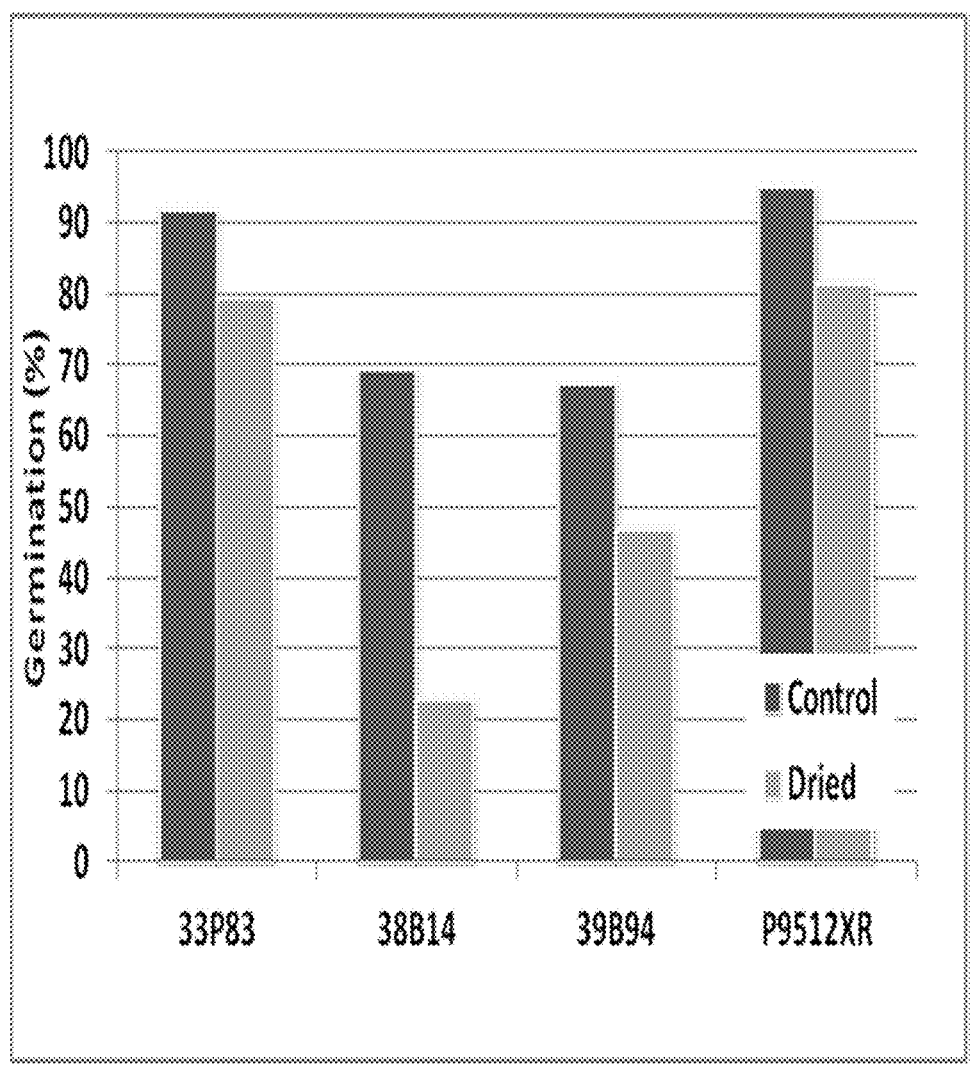

METHODS TO DIFFERENTIATE AND IMPROVE GERMPLASM FOR SEED EMERGENCE UNDER STRESS

FIELD

The present disclosure relates generally to seed germination and seed emergence. More specifically, it relates to methods for testing seed germination and predicting seed emergence under stressful field conditions.

BACKGROUND

In the commercial production of crops such as corn, seeds are commonly exposed to suboptimal soil temperatures and excess water, which can reduce crop establishment and productivity. There are several factors contributing to the exposure of seeds to these unfavorable conditions. For example, farmers often favor early spring planting, when the likelihood of cold, wet conditions is higher, to enhance yields by extending the growing season and reduce the potential for drought during flowering. Also, farmers who manage large acreages commonly start planting early to ensure they complete planting in a timely manner.

The sensitivity of crop seeds, such as corn, to cold conditions during crop establishment is a major limitation to productivity and yield. For example, the proportion of corn seeds that emerge and produce normal plants is significantly reduced in fields where average soil temperatures are at or below 10° C. after planting (Saab and Butzen, 2004, Diagnosing Chilling and Flooding Injury to Corn Prior to Emergence. Crop Insights Vol. 14, No 4). Also, flooding conditions such as those present in excessively wet soils can significantly limit crop establishment after as little as one day (VanToai, 1993, Field Performance of Abscisic Acid-Induced Flood Tolerant Corn. Crop Science 33:344-346).

Predicting successful establishment for crop plants is important for helping farmers manage early-planting risks. Even though there are potential advantages to early planting, such as higher crop yields, various challenges and unknown factors exist for farmers who choose to plant early. For example, planting into cold soils may delay seedling emergence. Extreme cold or snow which occurs after planting may reduce germination rates and result in decreased crop establishment. Corn planted under irrigation may experience stress if the irrigation water is too cold. In addition, an increasing trend in planting practices is to use no-till or minimal tillage planting. This practice may increase the amount of water and organic matter in the soil and decreases erosion. No-till or minimal/reduced tillage planting may result in lower soil temperatures, more water retained in the crop residue, and slower seedbed drying. These conditions, depending on the particular year, can negatively impact seed germination and crop emergence. As such, the development of new crop varieties and the identification of existing crop varieties with improved seed tolerance to cold and flooding stress is needed. However, progress in this area has been limited by the availability of predictive methods for testing and selecting germplasm for stress tolerance.

Currently, the most accepted standard for assessing the ability of seeds to germinate under field conditions is the cold test (Association of Official Seed Analysts, 2002, Seed Vigor Testing Handbook, AOSA, Stillwater, Okla.). The general test procedure involves subjecting seeds to a non-flooding, 10° C. stress period followed by a grow-out period at 25° C. The cold test is widely conducted at public institutions such as Iowa State University and Michigan Crop Improvement Association (http://www.michcrop.com/seedtesting.asp), and at commercial companies such as Precision Seed Research (http://www.psrcorn.com/seedtesting.html#warmcoldgerm). However, the cold test, which was developed as early as the 1950's (Clark, 1953, Relationship Between Certain Laboratory Tests and the Field Emergence of Sweet Corn. Proc. Assoc. Off. Seed Anal. 1953:42-44) has been reported to be non-reliable for predicting field emergence under cold, wet conditions (Burriss and Navratil 1979, Relationship Between Laboratory Cold-Test Methods and Field Emergence in Maize Inbreds. Agronomy Journal 71: 985-988). Also, the temperature of the test is not predictive of soil temperatures experienced by seeds in early planted fields. Therefore, these tests are generally not predictive of stressful field conditions and do not show sufficient differentiation among hybrids or varieties to allow for germplasm selection.

In general, the moisture content of seeds has a large influence on their germination ability. In commercial seed corn production, for example, seeds are dried to approximately 12 to 13% moisture to maintain maximum germination potential (Wych, R. D. 1988. Production of Hybrid Seed Corn. pp. 565-607. In: Sprague, G. F., Dudley, J. W., Editors. Corn and Corn Improvement, Third Edition. American Society of Agronomy, Crop Science Society of America, and Soil Science Society of America, Madison, Wis. 986 pp.). However, drying seed corn to lower moistures can significantly reduce germination ability under cold conditions as a result of injury to emerging seedling structures (Cohn, et al., (1979) Relationship of Stelar Lesions to Radicle Growth in Corn Seedling. Agronomy Journal 71:954-958). There are no known reports that demonstrate the use of drying to sub-optimal moisture content for genetic differentiation or selection for the ability to germinate and emerge under cold or flooding stress.

Herein, a soaking test was developed which closely reproduces cold, saturated field conditions commonly present in the field during early planting. This test can be used in combination with a method to dry the seed to sub-optimal moisture (ultra-drying) to identify hybrids or varieties with an improved ability to germinate and emerge under cold or flooding conditions.

Methods to impose stress on seeds in order to test germination and predict a seed's relative ability to emerge are disclosed herein. An advantage of this is the capability to evaluate the relative ability of genotypes to emerge under stressful field conditions.

SUMMARY

Methods for testing seed germination and predicting seed emergence in stressful field conditions are provided herein.

A first aspect features a method of testing a seed. The method comprises submerging the seed in an aqueous solution wherein temperature of the aqueous solution is between 0 degrees Celsius and 25 degrees Celsius; and evaluating the seed for germination.

Another aspect features a method of testing a seed. The method comprises submerging the seed in an aqueous solution wherein temperature of the aqueous solution is between 0 degrees Celsius and 30 degrees Celsius and wherein the seed has an initial moisture content between 1% and 18%; and evaluating the seed for germination.

In a particular embodiment, the seed has an initial moisture content between 1% and 15%.

In a particular embodiment, the seed has an initial moisture content between 1% and 18%.

In a particular embodiment, the seed has an initial moisture content between 1% and 3%.

In a particular embodiment, the seed has an initial moisture content between 1% and 7%.

In another embodiment, the seed has an initial moisture content between 3% and 7%.

In another embodiment, the seed has an initial moisture content between 7% and 11%.

In another embodiment, the seed has an initial moisture content between 6% and 13%.

In another embodiment, the seed has an initial moisture content between 11% and 15%.

In another embodiment, the seed has an initial moisture content between 12% and 18%.

In another embodiment, the seed has an initial moisture content of about 6% plus or minus about 2%.

In another embodiment, the seed has an initial moisture content of about 12% plus or minus about 2%.

In another embodiment, time of the submersion is from 5 minutes to 2 days.

In another embodiment, time of the submersion is from 5 minutes to 15 days.

In another embodiment, time of the submersion is from 5 minutes to 5 days.

In another embodiment, time of the submersion is from 2 days to 15 days.

In another embodiment, time of the submersion is from 5 days to 10 days.

In another embodiment, time of the submersion is from 10 days to 15 days.

In another embodiment, time of the submersion is about 4 days.

In another embodiment, time of the submersion is about 7 days.

In another embodiment, the temperature during the submersion is between 1 degree Celsius and 25 degrees Celsius.

In another embodiment, the temperature during the submersion is between 0 degree Celsius and 30 degrees Celsius.

In another embodiment, the temperature during the submersion is between 1 degree Celsius and 5 degrees Celsius.

In another embodiment, the temperature during the submersion is between 1 degree Celsius and 6 degrees Celsius.

In another embodiment, the temperature during the submersion is between 5 degrees Celsius and 10 degrees Celsius.

In another embodiment, the temperature during the submersion is between 5 degrees Celsius and 15 degrees Celsius.

In another embodiment, the temperature during the submersion is between 10 degrees Celsius and 15 degrees Celsius.

In another embodiment, the temperature during the submersion is between 15 degrees Celsius and 20 degrees Celsius.

In another embodiment, the temperature during the submersion is between 15 degree Celsius and 30 degrees Celsius.

In another embodiment, the temperature during the submersion is between 20 degrees Celsius and 25 degrees Celsius.

In another embodiment, the temperature during the submersion is about 4 degrees Celsius.

In another embodiment, the temperature during the submersion is about 10 degrees Celsius.

In another embodiment, the submersion comprises submerging 10% to 100% of a surface of said seed in the aqueous solution.

In another embodiment, the submersion comprises submerging 10% to 33% of a surface of said seed in the aqueous solution.

In another embodiment, the submersion comprises submerging 33% to 67% of a surface of said seed in the aqueous solution.

In another embodiment, the submersion comprises submerging 67% to 100% of a surface of said seed in the aqueous solution.

In another embodiment, the submersion comprises submerging about 100% of a surface of said seed in the aqueous solution.

In another embodiment, the aqueous solution is water.

In a further embodiment, the aqueous solution for the submersion comprises addition of antibiotics, anti-fungal components, electrolytes, preservatives, EDTA, salts, nutrients, and/or growth regulators.

In another embodiment, the method comprises submerging the seed in the aqueous solution, wherein the aqueous solution is below 25 degrees Celsius; removing the seed from the aqueous solution; and, placing the seed at room temperature.

In other embodiments, the seed is dried prior to the submergence.

In another embodiment, the seed is dried in an oven.

In another embodiment, the seed is dried using salt solutions, dry salts, or chemical desiccants.

In another embodiment, the seed is dried at 40 degrees Celsius or above.

In another embodiment, the seed is dried at 22 degrees Celsius or above.

In another embodiment, the seed is dried with active air circulation.

In another embodiment, the seed is dried for greater than 8 hours.

In another embodiment, the seed is dried to about 6% moisture.

In another embodiment, the seed emergence is evaluated in a controlled environment.

In another embodiment, the seed is evaluated in a controlled environment.

In another embodiment, the seed is evaluated in a field.

In another embodiment, the seed is evaluated in laboratory or greenhouse conditions.

In another embodiment, the seed is an inbred seed.

In another embodiment, the seed is a hybrid seed.

In another embodiment, the seed is a haploid seed.

In another embodiment, the seed is a double haploid seed.

In another embodiment, the seed is analyzed for one or more characteristics indicative of at least one genetic trait.

In another embodiment, the seed is a variety.

In another embodiment, the seed is a population seed.

In another embodiment, the seed is a maize (*Zea mays*) seed.

In another embodiment, the seed produces a plant that is subject to environmental stresses during seed emergence.

In another embodiment, the seed is planted in early spring.

In another embodiment, the seed is selected from the group consisting of maize (*Zea mays*), soybean (*Glycine max*), cotton (*Gossypium hirsutum*), peanut (*Arachis hypogaea*), barley (*Hordeum vulgare*), oats (*Avena sativa*), orchard grass (*Dactylis glomerate*), rice (*Oryza sativa*, including *indica* and *japonica* varieties), sorghum (*Sorghum bicolor*), sugar cane (*Saccharum* sp), tall fescue (*Festuca arundinacea*), turfgrass species (for example, *Agrostis stolonifera, Poa pratensis, Stenotaphrum secundatum*), wheat (*Triticum aestivum*), alfalfa (*Medicago sativa*), members of the genus *Brassica*, broccoli, cabbage, carrot, cauliflower, Chinese cabbage, cucumber, dry bean, eggplant, fennel, garden beans, gourd, leek, lettuce, melon, okra, onion, pea, pepper, pumpkin, radish, spinach, squash, sweet corn, tomato, watermelon, ornamental plants, and other fruit, vegetable, tuber, and root crops.

In a further embodiment, the seed contains a recombinant DNA construct.

Another aspect features a method for identifying performance of one or more transgenic traits. The method comprises screening seed containing said one or more transgenic traits comprising submerging the seed in an aqueous solution wherein temperature of the aqueous solution is between 0 degrees Celsius and 30 degrees Celsius and wherein the seed has an initial moisture content between 1% and 18% and evaluating the seed for germination, wherein the heritable variation for the submersion test is linked to a seed sample carrying at least one transgenic trait.

In a further embodiment, the heritable variation for the submersion tested is linked to the recombinant DNA construct.

BRIEF DESCRIPTION OF THE FIGURES

The disclosure can be more fully understood from the following detailed description and the accompanying drawings which form a part of this application.

FIG. 2 shows a comparison of results for germination in the cold test (FIG. 2-A) and germination in the Cold Soak Test (FIG. 2-B) for ultra-dried and control entries. Three commercial corn hybrids were tested in both tests.

FIG. 4 shows the effect of cold storage on seed moisture and germination in the Cold Soak Test following ultra-drying for two corn hybrids. In FIG. 4-A, 36Y26 was tested and in FIG. 4-B, 35F40 was tested.

FIG. 5 shows a comparison of control and ultra-dried seed in the warm germination test (FIG. 5-A) and the Cold Soak Test (FIG. 5-B). Four commercial corn hybrids were tested.

DETAILED DESCRIPTION

Figure 1:
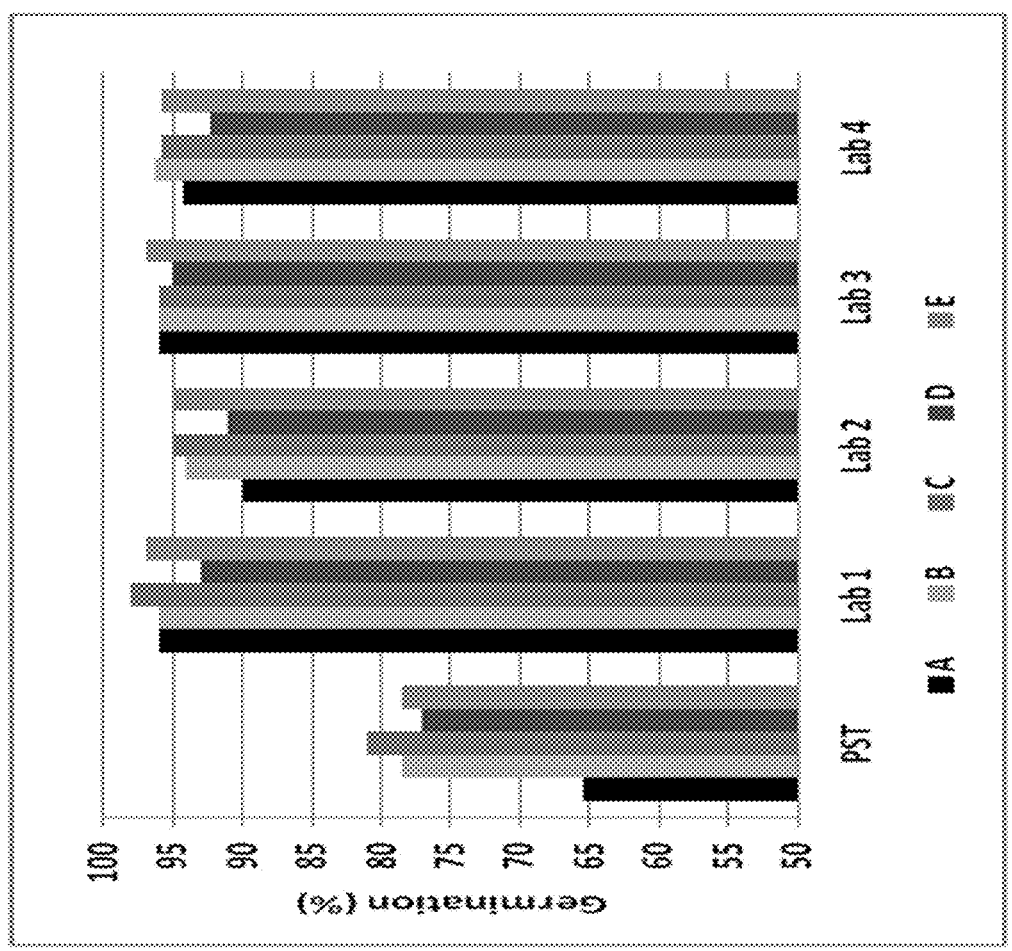
FIG. 1 shows a comparison of results of the Pioneer Stress Test (PST) and third party tests for the assessment of seed quality of commercial corn seed. Five hybrid samples labeled A-E are shown in the different shaded bars. Sample A represents a low quality check.

Units, prefixes, and symbols are denoted in their International System of Units (SI) accepted form. Numeric ranges recited within the specification are inclusive of the numbers defining the range and include each integer within the defined range. The terms defined below are more fully defined by reference to the specification as a whole. Section headings provided throughout the specification are provided for convenience and are not limitations to the various objects and embodiments of the present disclosure.

The disclosure of each reference set forth herein is hereby incorporated by reference in its entirety, to the extent they relate to the materials and methods described herein.

As used herein and in the appended claims, the singular forms "a", "an", and "the" include plural reference unless the context clearly dictates otherwise. Thus, for example, reference to "a plant" includes a plurality of such plants, reference to "a cell" includes one or more cells, reference to "a seed" includes plurality of such seeds, and equivalents thereof known to those skilled in the art, and so forth.

The term "aqueous solution" refers to a water-based medium that contains, among other things, antibiotics, anti-fungi components, electrolytes, preservatives, EDTA, salts, nutrients and/or growth regulators. Antibiotics are defined as agents that kill bacteria or suppress bacterial growth. Antibiotics may include, but are not limited to, ampicillin (Saab, I. N. and Sachs, M. M. 1996 A Flooding-Induced Xyloglucan Endo-Transglycosylase Homolog in Maize Is Responsive to Ethylene and Associated with Aerenchyma, 112: 385-391, *Plant Physiol.*). Anti-fungi components refers to agents that kill fungi or suppress fungal growth. Electrolytes are substances that contain free ions and serve as electrically conductive medium. The aqueous solution may also contain nutrients.

Artificial can be defined as not natural or not found in nature. Natural can be defined as found in nature or native to the species in question.

Celsius may be referred to as degrees Celsius or ° C.

"Cold stress emergence" refers to the germination or emergence of seeds or crops under field or laboratory conditions that are characterized by suboptimal germination temperatures for the crop in question.

A "commercial product" is a product that can be purchased or licensed in the marketplace.

As used herein, the term "comprising" means "including but not limited to."

The term "dicot" refers to the subclass of angiosperm plants also known as "dicotyledoneae" and includes reference to whole plants, plant organs (e.g., leaves, stems, roots, etc.), seeds, plant cells, and progeny of the same. Plant cell, as used herein includes, without limitation, seeds, suspension cultures, embryos, meristematic regions, callus tissue, leaves, roots, shoots, gametophytes, sporophytes, pollen, and microspores. The terms "dicot" and "dicotyledonous plant" are used interchangeably herein.

The term "emerge" refers to the appearance of a seedling shoot above the germination medium, for example the soil surface in a field.

The term "emergence rate" refers to a percentage of planted seeds that emerge. For example, 80% emergence rate indicates 80 of 100 planted seeds emerge.

"Environmental conditions" refer to conditions under which the plant is grown, such as temperature, the availability of water, availability of nutrients (for example nitrogen), or the presence of insects or disease.

"Environmental stresses during seed emergence" refers to climatic or soil conditions occurring during seed germination or emergence that are considered stressful to the particular crop species. These include, but are not limited to, cold soil, flooding (submergence), cold rain, frost, snow, soil compaction, and excessive residue from previous crops.

"Gene" refers to a nucleic acid fragment that expresses a specific protein, including regulatory sequences preceding (5' non-coding sequences) and following (3' non-coding sequences) the coding sequence. "Native gene" refers to a gene as found in nature with its own regulatory sequences. "Chimeric gene" refers to any gene that is not a native gene, comprising regulatory and coding sequences that are not found together in nature. Accordingly, a chimeric gene may comprise regulatory sequences and coding sequences that are derived from different sources, or regulatory sequences and coding sequences derived from the same source, but arranged in a manner different than that found in nature. A "foreign" gene refers to a gene not normally found in the host organism, but that is introduced into the host organism by gene transfer. Foreign genes can comprise native genes inserted into a non-native organism, or chimeric genes. A "transgene" is a gene that has been introduced into the genome by a transformation procedure.

A genetic trait is a heritable characteristic of a variety or hybrid.

The term "genotype" is the genetic constitution of an individual (or group of individuals) at one or more genetic loci, as contrasted with the observable trait (the phenotype). Genotype is defined by the allele(s) of one or more known loci that the individual has inherited from its parents. The term genotype can be used to refer to an individual's genetic constitution at a single locus, at multiple loci, or, more generally, the term genotype can be used to refer to an individual's genetic make-up for all the genes in its genome.

"Germplasm" refers to genetic material of or from an individual (e.g., a plant), a group of individuals (e.g., a plant line, variety or family), or a clone derived from a line, variety, species, or culture. The germplasm can be part of an organism or cell, or can be separate from the organism or cell. In general, germplasm provides genetic material with a specific molecular makeup that provides a physical foundation for some or all of the hereditary qualities of an organism or cell culture. As used herein, germplasm includes cells, seed or tissues from which new plants may be grown, or plant parts, such as leafs, stems, pollen, or cells that can be cultured into a whole plant.

The term "germination" refers to the initial stages in the growth of a seed to form a seedling. A seed is considered germinated if it shows signs of radicle (root) or shoot protrusion, or if the emerging seedling structures meet specific criteria such as those of the International Rules for Seed Testing (International Seed Testing Association, ISTA) or the Association of Official Seed Analysts, Inc., AOSA). The term "germinated" may refer to a seed that has produced a viable plant seedling with or without exposure to light in a germination chamber, growth cabinet, greenhouse or the field.

The Cold Soak Test, or "CS", refers to germination of seeds in the Cold Soak Test described herein. Cold Soak Test and Cold Soak are used interchangeably herein.

A "haplotype" is the genotype of an individual at a plurality of genetic loci, i.e. a combination of alleles. Typically, the genetic loci described by a haplotype are physically and genetically linked, i.e., on the same chromosome segment. The term "haplotype" can refer to sequence polymorphisms at a particular locus, such as a single marker locus, or sequence polymorphisms at multiple loci along a chromosomal segment in a given genome. The former can also be referred to as "marker haplotypes" or "marker alleles", while the latter can be referred to as "long-range haplotypes".

Haploids are organisms having only one complete set of chromosomes, ordinarily half the normal diploid number. Doubled Haploids are organisms having two sets of chromosomes The term "heritable variation" refers to variation that is inherited from a male or female parent.

A "hybrid plant" or "hybrid progeny" is an individual produced from genetically different parents (i.e., a genetically heterozygous or mostly heterozygous individual). Typically, the parents of a hybrid differ in several important respects. Hybrids are often more vigorous than either parent, but they cannot breed true.

The term hybrid variety refers to a substantially heterozygous hybrid line and minor genetic modifications thereof that retain the overall genetics of the hybrid line including but not limited to a locus conversion, a mutation, or a somoclonal variant.

The term inbred refers to a variety developed through inbreeding or doubled haploidy that preferably comprises homozygous alleles at about 95% or more of its loci.

The term inbred variety refers to a substantially homozygous inbred line and minor modifications thereof that retain the overall genetics of the inbred line including but not limited to a locus conversion, a mutation, or a somoclonal variant.

An "inbred line" of plants is a genetically homozygous or nearly homozygous population. An inbred line, for example, can be derived through several cycles of selfing. Inbred lines breed true, e.g., for one or more phenotypic traits of interest. An "inbred plant" or "inbred progeny" is a plant sampled from an inbred line.

"Improved and/or increased germination or emergence under stressed conditions" is a measure of a seeds ability to germinate and/or produce a viable seedling under stressed conditions, including but not limited to cold, drought, flooding and heat, as compared to a seed from matching genetics under non-stressed conditions.

Laboratory can be defined as an environment where controlled studies or experiments are conducted.

"Maize" refers to a plant of the *Zea mays* L. ssp. *mays* and is also known as "corn".

The term "maize plant" includes: whole maize plants, maize plant cells, maize plant protoplast, maize plant cell or maize tissue cultures from which maize plants can be regenerated, maize plant calli, and maize plant cells that are intact in maize plants or parts of maize plants, such as maize seeds, maize cobs, maize flowers, maize cotyledons, maize leaves, maize stems, maize buds, maize roots, maize root tips, and the like.

Minutes may be referred to as minutes or "mins".

The terms "monocot" and "monocotyledonous plant" are used interchangeably herein. A monocot of the current invention includes the *Gramineae*.

The terms "phenotype", or "phenotypic trait" or "trait" refers to one or more traits of an organism. The phenotype can be observable to the naked eye, or by any other means of evaluation known in the art, e.g., microscopy, biochemical analysis, or an electromechanical assay. In some cases, a phenotype is directly controlled by a single gene or genetic locus, i.e., a "single gene trait". In other cases, a phenotype is the result of several genes.

The phrase "phenotypic trait" refers to the appearance or other detectable characteristic of a plant, resulting from the interaction of its genome with the environment.

A "plant" can be a whole plant, any part thereof, or a cell or tissue culture derived from a plant. Thus, the term "plant" can refer to any of: whole plants, plant components or organs (e.g., leaves, stems, roots, etc.), plant tissues, seeds, plant cells, and/or progeny of the same. A plant cell is a cell of a plant, taken from a plant, or derived through culture from a cell taken from a plant. Plant cells include, without limitation, cells from seeds, suspension cultures, embryos, meristematic regions, callus tissue, leaves, roots, shoots, gametophytes, sporophytes, pollen, and microspores.

Plant stand is the ability of a group of seeds to emerge and form normal seedlings, commonly under field conditions. Plant stand may also be referred to as stand establishment.

Population is a group of individuals.

The term "progeny" refers to the descendants of a particular plant (self cross) or pair of plants (cross-pollinated). The descendants can be, for example, of the $F_1$, the $F_2$, or any subsequent generation.

"Ranking" refers to listing individuals according to performance or score in a specific test.

The term "recovering" refers to an increase in seed germination or crop emergence associated with removal of the seed or emerging seedling from a stressful environment. For example, recovery may be brought about by storing ultra-dried seeds in conditions that allow a gain in seed moisture to more favorable levels.

A seed used herein encompasses a reproductive structure of seed plants that generally consists of an embryo or embryonic axis which may be enclosed by a seed coat and storage organs such as scutellum, cotyledon, or endosperm. In some species, the primary outermost structure is a fruit coat, known as pericarp. In monocots, the embryonic leaves and root (radicle) maybe covered by or protective structures such as coleoptile and coleorhiza. Seeds of grain crops such as corn, rice and wheat are considered as fruit structures and are often referred to as caryopses.

Seed used herein may also include artificial seed, or manufactured seed, or synthetic seed. Artificial seed is an encapsulated plant proagule in an appropriate matrix. Artificial seeds typically may contain a plant propagule, a matrix, and a seed shell. Synthetic or artificial seeds have been defined as somatic embryos engineered for use in the commercial propagation of plants (Gray and Purohit, 1991; Redenbaugh, 1993).

Seed Treatments

Seedling diseases can result in plant stand reduction and yield loss. Fungal diseases are known to infect seed. The aqueous solution used for seed germination during the stress test can contain components to either aid germination or reduce it. Several components are well known in the literature for that purpose. Prior to planting, most corn seed in the United States is treated with a combination of contact and systemic anti-fungal agents. In the industry, antifungal corn seed treatments have been tested on germination, plant population, and yield.

Seed Moisture

Seed moisture is an important measure as it helps determine germination, breakage (mechanical damage), and susceptibility to some diseases. Seed moisture content can be defined as the amount of water in the seed and is usually expressed as a percentage. It can be expressed on either a wet weight basis (where it is expressed as a percentage of the fresh weight or initial weight of the seed) or on a dry weight basis (where it is expressed as a percentage of the dry weight of the seed).

"Initial seed moisture" refers to the moisture content of the seed samples before ultra-drying or before the start of the germination tests.

In a particular embodiment of the disclosure, the seed has an initial moisture content between 1% and 15%. The initial seed moisture content comprises 1%, 2%, 3%, 4%, 5%, 6%, 7%, 8%, 9%, 10%, 11%, 12%, 13%, 14%, or 15%. This range includes any value including, and between, 1% and 15%.

In a particular embodiment of the disclosure, the seed has an initial moisture content between 1% and 18%. The initial seed moisture content comprises 1%, 2%, 3%, 4%, 5%, 6%, 7%, 8%, 9%, 10%, 11%, 12%, 13%, 14%, 15%, 16%, 17%, or 18%. This range includes any value including, and between, 1% and 18%.

In a particular embodiment of the disclosure, the seed has an initial moisture content between 1% and 3%. The initial seed moisture content comprises 1%, 2%, or 3%. This range includes any value including, and between, 1% and 3%.

In another embodiment of the disclosure, the seed has an initial moisture content between 1% and 7%. The initial seed moisture content comprises 1%, 2%, 3%, 4%, 5%, 6%, or 7%. This range includes any value including, and between, 1% and 7%.

In another embodiment of the disclosure, the seed has an initial moisture content between 7% and 11%. The initial seed moisture content comprises 7%, 8%, 9%, 10%, or 11%. This range includes any value including, and between, 7% and 11%.

In another embodiment of the disclosure, the seed has an initial moisture content between 6% and 13%. The initial seed moisture content comprises 6%, 7%, 8%, 9%, 10%, 11%, 12%, or 13%. This range includes any value including, and between, 6% and 13%.

In another embodiment of the disclosure, the seed has an initial moisture content between 12% and 18%. The initial seed moisture content comprises 12%, 13%, 14%, 15%, 16%, 17%, or 18%. This range includes any value including, and between, 12% and 18%.

In another embodiment of the disclosure, the seed has an initial moisture content between 11% and 15%. The initial seed moisture content comprises 11%, 12%, 13%, 14%, or 15%. This range includes any value including, and between, 11% and 15%.

In another embodiment of the disclosure, the seed has an initial moisture content of about 6% plus or minus about 2%. The initial seed moisture content comprises about 6%, 5%, 4%, 7%, or 8%. This includes any value including, and between, 4% and 8%.

In another embodiment of the disclosure, the seed has an initial moisture content of about 12% plus or minus about 2%. The initial seed moisture content comprises about 12%, 11%, 10%, 13%, or 14%. This includes any value including, and between, 10% and 14%.

Seed Drying

In many grain crops, seed drying usually begins naturally while the crop is in the field. In commercial seed corn production, the crop is generally harvested when the kernels are close to achieving physiological maturity, which refers to the stage of maximum dry matter accumulation. This stage is chosen to reduce the potential for damage due to frost if the crop remains in the field later into the Fall, as well as likelihood of physical damage caused by harvesting seed that is too wet (Wych, R. D. 1988. Production of Hybrid Seed Corn. pp. 565-607. In: Sprague, G. F., Dudley, J. W., Editors. Corn and Corn Improvement, Third Edition. American Society of Agronomy, Crop Science Society of America, and Soil Science Society of America, Madison, Wis. 986 pp.). Seed corn is subsequently dried to approximately 12 to 13% moisture to maintain maximum germination potential and also to reduce the potential of germination loss to mold and insects (Neuffer, M. G. 1994. Growing Maize for Genetic Studies. In: Freeling, M and Walbot, V. Editors. The Maize Handbook. Springer-Verlag, New York. 759 pp.).

There are several factors that influence seed drying including, but not limited to, temperature, humidity, air circulation and duration. The choice of drying depends on several factors, including long term usage of the seed and seed use. Seed drying methods include, but are not limited to, incubator-drying, drying cabinets, forced air drying, oven drying, microwave drying, sun drying, and drying over saturated salt solutions (Winston, P. W. and Bates, D. H. (1960) Saturated Solutions for the Control of Humidity in Biological Research. Ecology 41:232-237). Various desiccants may be used in combination with seed drying methods.

Seeds drying may also include, but is not limited to, using salt solutions, dry salts or chemical desiccants. Seeds may be dried using silica gel, activated charcoal, calcium salts, clay, and molecular sieves. Salt solutions, dry salts or chemical desiccants may be used in an oven or may not be used in an oven for seed drying.

Seeds may be dried at a range of temperatures, including room temperature and ambient outdoor temperature, with or without air circulation.

In a particular embodiment of the disclosure, the seed is dried at 22 degrees Celsius or above.

In another embodiment of the disclosure, the seed is dried at 40 degrees Celsius or above. Seeds may be dried at 40 degrees, 41 degrees, 42 degrees, 43 degrees, 44 degrees, 45 degrees, or above. Depending upon the method of drying and environmental conditions, seeds may be dried at a range of temperatures, both indoors and outdoors, including room temperature and ambient outdoor temperature, with or without air circulation.

In a particular embodiment of the disclosure, the seed is dried for greater than 8 hours. This comprises 8 hours, 9 hours, 10 hours, 11 hours, 12 hours, 13 hours, 13 hours, 15 hours, 16 hours, 17 hours, 18 hours, 19 hours, 20 hours, 21 hours, 22 hours, 23 hours, 24 hours, 2 days, 3 days, 4 days, 5 days, 6 days, 7 days, 8 days, 9 days, 10 days, 11 days, 12 days, 13 days, 14 days, 2 weeks, 3 weeks, 4 weeks, 5 weeks, 6 weeks, 7 weeks, 8 weeks, 9 weeks, 10 weeks, 11 weeks, or 12 weeks. This comprises any increment of time, thereof, between and including 8 hours to 12 weeks. Increments of time may be in seconds, minutes, hours, days, and/or weeks.

In a particular embodiment of the disclosure, the seed is dried to about 6% moisture. This comprises 4%, 5%, 6%, 7%, or 8% moisture.

In a particular embodiment of the disclosure, the seed is dried using salt solutions, dry salts, or chemical desiccants.

In another embodiment, the seed is dried in an oven.

The term "seed volume" refers to the volume occupied by a specified weight or number of seeds.

The term "spring" refers to one of the four temperate seasons occurring between winter and summer. The exact timing of spring varies according to geographic region and climate. In the United States, for example, spring usually begins at the end of March. Observations of stressful conditions common to early spring can also occur at other planting dates.

"Stress emergence" refers to the genetic ability to emerge and establish a stand under less-than-optimal conditions.

The term "submerge" or "submerging" or "submersion" refers to placing the seed in a liquid or aqueous germination medium whereby the seeds are completely covered with the liquid and are subjected to conditions of oxygen deprivation. A "submersion test" is a test that utilizes submergence or flooding as the primary treatment.

The term "subsequent generations" refers to future generations of offsprings derived from a particular variety or groups of varieties.

Temperature

In one embodiment of the disclosure, said temperature during the submersion is between 0 degree Celsius and 30 degrees Celsius. This comprises 0 degree, 1 degree Celsius, 2 degrees Celsius, 3 degrees Celsius, 4 degrees Celsius, 5 degrees Celsius, 6 degrees Celsius, 7 degrees Celsius, 8 degrees Celsius, 9 degrees Celsius, 10 degrees Celsius, 11 degrees Celsius, 12 degrees Celsius, 13 degrees Celsius, 14 degrees Celsius, 15 degrees Celsius, 16 degrees Celsius, 17 degrees Celsius, 18 degrees Celsius, 19 degrees Celsius, 20 degrees Celsius, 21 degrees Celsius, 22 degrees Celsius, 23 degrees Celsius, 24 degrees Celsius, 25 degrees Celsius, 26 degrees Celsius, 27 degrees Celsius, 28 degrees Celsius, 29 degrees Celsius, or 30 degrees Celsius. This range includes any value including, and between, 0 degrees Celsius and 30 degrees Celsius.

In another embodiment of the disclosure, said temperature during the submersion is between 1 degree and 6 degrees Celsius. This comprises 1 degree Celsius, 2 degrees Celsius, 3 degrees Celsius, 4 degrees Celsius, 5 degrees Celsius, or 6 degrees Celsius. This range includes any value including, and between, 1 degree Celsius and 6 degrees Celsius.

In another embodiment of the disclosure, said temperature during the submersion is between 5 degrees and 15 degrees Celsius. This comprises 5 degrees Celsius, 6 degrees Celsius, 7 degrees Celsius, 8 degrees Celsius, 9 degrees Celsius, 10 degrees Celsius, 11 degrees Celsius, 12 degrees Celsius, 13 degrees Celsius, 14 degrees Celsius, or 15 degrees Celsius. This range includes any value including, and between, 5 degrees Celsius and 15 degrees Celsius.

In another embodiment of the disclosure, said temperature during the submersion is between 10 degrees and 15 degrees Celsius. This comprises 10 degrees Celsius, 11 degrees Celsius, 12 degrees Celsius, 13 degrees Celsius, 14 degrees Celsius, or 15 degrees Celsius. This range includes any value including, and between, 10 degrees Celsius and 15 degrees Celsius.

In another embodiment of the disclosure, said temperature during the submersion is between 15 degrees and 30 degrees Celsius. This comprises 15 degrees Celsius, 16 degrees Celsius, 17 degrees Celsius, 18 degrees Celsius, 19 degrees Celsius, 20 degrees Celsius, 21 degrees Celsius, 22 degrees Celsius, 23 degrees Celsius, 24 degrees Celsius, 25 degrees Celsius, 26 degrees Celsius, 27 degrees Celsius, 28 degrees Celsius, 29 degrees Celsius, or 30 degrees Celsius. This range includes any value including, and between, 15 degrees Celsius and 30 degrees Celsius.

In another embodiment of the disclosure, said temperature during the submersion is between 20 degrees and 25 degrees Celsius. This comprises 20 degrees Celsius, 21 degrees Celsius, 22 degrees Celsius, 23, 24 degrees Celsius degrees Celsius, or 25 degrees Celsius. This range includes any value including, and between, 20 degrees Celsius and 25 degrees Celsius.

In another embodiment of the disclosure, said temperature during the submersion is about 4 degrees Celsius. This comprises 4 degrees Celsius, 3 degrees Celsius, 2 degrees Celsius, 5 degrees Celsius, or 6 degrees Celsius. This includes any value including, and between, 2 degrees Celsius and 6 degrees Celsius.

In another embodiment of the disclosure, said temperature during the submersion is about 10 degrees Celsius. This comprises 10 degrees Celsius, 9 degrees Celsius, 8 degrees Celsius, 11 degrees Celsius, or 12 degrees Celsius. This includes any value including, and between, 8 degrees Celsius and 12 degrees Celsius.

Time of Submersion

In one embodiment of the disclosure, time of the submersion is from 5 minutes to 2 days. This comprises 5 mins, 10 mins, 15 mins, 20 mins, 25 mins, 30 mins, 35 mins, 40 mins, 45 mins, 50 mins, 55 mins, 60 mins, 1 hour, 2 hours, 3 hours, 4 hours, 5 hours, 6 hours, 7 hours, 8 hours, 9 hours, 10 hours, 11 hours, 12 hours, 13 hours, 14 hours, 15 hours, 16 hours, 17 hours, 18 hours, 19 hours, 20 hours, 21 hours, 22 hours, 23 hours, 24 hours, or 2 days. Increments of time may be in seconds, minutes, hours, and/or days. This range includes any value including, and between, 5 minutes and 2 days.

In one embodiment of the disclosure, time of the submersion is from 5 minutes to 15 days. This comprises 5 mins, 10 mins, 15 mins, 20 mins, 25 mins, 30 mins, 35 mins, 40 mins, 45 mins, 50 mins, 55 mins, 60 mins, 1 hour, 2 hours, 3 hours, 4 hours, 5 hours, 6 hours, 7 hours, 8 hours, 9 hours, 10 hours, 11 hours, 12 hours, 13 hours, 14 hours, 15 hours, 16 hours, 17 hours, 18 hours, 19 hours, 20 hours, 21 hours, 22 hours, 23 hours, 24 hours, 1 day, 2 days, 3 days, 4 days, 5 days, 6 days, 7 days, 8 days, 9 days, 10 days, 11 days, 12 days, 13 days, 14 days or 15 days. This comprises any increment of time, thereof, between and including 5 minutes to 15 days. Increments of time may be in seconds, minutes, hours, and/or days. This range includes any value including, and between, 5 minutes and 15 days.

In another embodiment of the disclosure, time of the submersion is from 5 minutes to 5 days. This comprises 5 mins, 10 mins, 15 mins, 20 mins, 25 mins, 30 mins, 35 mins, 40 mins, 45 mins, 50 mins, 55 mins, 60 mins, 1 hour, 2 hours, 3 hours, 4 hours, 5 hours, 6 hours, 7 hours, 8 hours, 9 hours, 10 hours, 11 hours, 12 hours, 13 hours, 14 hours, 15 hours, 16 hours, 17 hours, 18 hours, 19 hours, 20 hours, 21 hours, 22 hours, 23 hours, 24 hours, 1 day, 2 days, 3 days, 4 days, or 5 days. This comprises any increment of time, thereof, between and including 5 minutes to 5 days. Increments of time may be in seconds, minutes, hours, and/or days. This range includes any value including, and between, 5 minutes and 5 days.

In another embodiment of the disclosure, time of the submersion is from 2 days to 15 days. This comprises 48 hours, 2 days, 3 days, 4 days, 5 days, 6 days, 7 days, 8 days, 9 days, 10 days, 11 days, 12 days, 13 days, 14 days, or 15 days. This comprises any increment of time, between and including 2 days and 15 days. Increments of time may be in seconds, minutes, hours, and/or days. This range includes any value including, and between, 2 days and 15 days.

In another embodiment of the disclosure, time of the submersion is from 5 days to 10 days. This comprises 5 days, 6 days, 7 days, 8 days, 9 days, or 10 days. This comprises any increment of time, thereof, between and including 5 days to 10 days. Increments of time may be in seconds, minutes, hours, and/or days. This range includes any value including, and between, 5 days and 10 days.

In another embodiment of the disclosure, time of the submersion is from 10 days to 15 days. This comprises 10 days, 11 days, 12 days, 13 days, 14 days or 15 days. This comprises any increment of time, thereof, between and including 10 days to 15 days. Increments of time may be in seconds, minutes, hours, and/or days. This range includes any value including, and between, 10 days and 15 days.

In another embodiment of the disclosure, time of submersion is about 4 days. This comprises 2 days, 3 days, 4 days, 5 days, or 6 days. This comprises any increment of time, thereof, between and including 2 days to 6 days. Increments of time may be in seconds, minutes, hours, and/or days.

In another embodiment of the disclosure, time of submersion is about 7 days. This comprises 5 days, 6 days, 7 days, 8 days, or 9 days. This comprises any increment of time, thereof, between and including 5 days to 9 days. Increments of time may be in seconds, minutes, hours, and/or days.

Submersion

In one embodiment of the disclosure, the submersion comprises submerging 10% to 100% of a surface of said seed in the aqueous solution. This comprises 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100%.

In another embodiment of the disclosure, the submersion comprises submerging 10% to 33% of a surface of said seed in the aqueous solution. This comprises 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, or 33%.

In another embodiment of the disclosure, the submersion comprises submerging 33% to 67% of a surface of said seed in the aqueous solution. This comprises 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, or 67%.

In another embodiment of the disclosure, the submersion comprises submerging about 100% of a surface of said seed in the aqueous solution. This comprises 98%, 99%, or 100%.

The present invention further relates to transgenic plant cells and transgenic plants having been transformed to contain and express a polynucleotide. "Transformed", "transfected", or "transgenic" refers to a cell, tissue, organ, or organism into which has been introduced a foreign nucleic acid, such as a recombinant vector. Preferably, the introduced nucleic acid is integrated into the genomic DNA of the recipient cell, tissue, organ or organism such that the introduced nucleic acid is inherited by subsequent progeny. A "transgenic" or "transformed" cell or organism also includes progeny of the cell or organism and progeny produced from a breeding program employing such a "transgenic" plant as a parent in a cross and exhibiting an altered phenotype resulting from the presence of a recombinant construct or vector. The method of transformation is not critical to the current invention and various methods of plant transformation are currently known and available. For example, the introduction of DNA sequences into plants and/or plant cells can be accomplished by *Agrobacterium* mediated transformation, viral vector mediated transformation, electroporation, and microprojectile bombardment mediated transformation (particle gun or biolistics methods). The DNA sequence may also be transformed directly into the plastid genome by plastid transformation. As used herein, the term "plastid" means the class of plant cell organelles that includes amyloplasts, chloroplasts, chromoplasts, elaioplasts, eoplasts, etioplasts, leucoplasts, and proplastids. These organelles are self-replicating, and contain what is commonly referred to as the "chloroplast genome," a circular DNA molecule that ranges in size from about 120 to about 217 kb, depending upon the plant species, and which usually contains an inverted repeat region.

Transgenic events can include traits for herbicide resistance, drought, yield, oil content of the seed, starch content of the seed, carbon partitioning within the seed, insecticide resistance, and a myriad of other traits.

"Ultra-drying" refers to drying the seeds to moisture contents that are considered suboptimal for optimal germination. Ultra-drying has been reported as a method for long term preservation of plant biodiversity.

Variety is a plant or group of plants selected for distinct desirable characteristics that can be maintained by propagation.

The term "yield" refers to the productivity per unit area of a particular plant product of commercial value. For example, yield of maize is commonly measured in bushels of seed per acre or metric tons of seed per hectare per season. Yield is affected by both genetic and environmental factors. "Agronomics", "agronomic traits", and "agronomic performance" refer to the traits (and underlying genetic elements) of a given plant variety that contribute to yield over the course of a growing season. Individual agronomic traits include emergence vigor, vegetative vigor, stress tolerance, disease resistance or tolerance, herbicide resistance, branching, flowering, seed set, seed size, seed density, standability, threshability and the like. Yield is, therefore, the final culmination of all agronomic traits.

All publications and patent applications mentioned in the specification are indicative of the level of those skilled in the art to which this invention pertains. All publications and patent applications are herein incorporated by reference to the same extent as if each individual publication or patent application was specifically and individually indicated to be incorporated by reference.

Although the foregoing invention has been described in some detail by way of illustration and example for purposes of clarity of understanding, it will be obvious that certain changes and modifications may be practiced within the scope of the appended claims.

EXPERIMENTAL

The present invention is further defined in the following Examples, in which parts and percentages are by weight and degrees are Celsius, unless otherwise stated. It should be understood that these Examples, while indicating embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various usages and conditions. Thus, various modifications of the invention in addition to those shown and described herein will be apparent to those skilled in the art from the foregoing description. Such modifications are also intended to fall within the scope of the appended claims.

The disclosure of each reference set forth herein is incorporated herein by reference in its entirety.

Example 1

Development of Stress Test Systems

Germplasm: Materials used were either Pioneer commercial hybrids obtained from Pioneer's production department or pre-commercial transgenic seed obtained from Pioneer's research department.

Initial Seed Moisture Determination: Initial seed moisture refers to the moisture content of the seed samples before ultra-drying or before the start of the germination tests. All seed material used was from commercially produced Pioneer® hybrids. For each sample, seeds were counted into 3 replicates of 100 kernels and initial moisture content was determined on fresh weight basis after drying in an oven at 104° C. for 72 hours.

Seed Storage Experiments: Seeds were placed in paper envelopes in both the laboratory (average temperature was 24° C. and average RH was 29%) or cold room (average temperature was 10° C. and average RH was 41%) for up to 10 weeks. Temperature and humidity was tracked in the cold room and the laboratory using a HOBO U10 data logger.

Cold Test: Three replications of 50 kernels were planted onto moistened germination paper. Samples were rolled and placed into a germination chamber at 10° C. for a period of 7 days. Samples were then transferred to a germination chamber set to 25° C. for 3 days. Samples were scored for normal seedlings using Association of Official Seed Analysts (AOSA) criteria for seed testing.

Cold Soak Test: The Cold Soak Test may be used for hybrids or inbreds. For hybrids, the protocols is as follows: Seeds were counted into 3-4 replications of 50 kernels and placed into waxed paper (Dixie) cups. Cups were filled with 100 mL pre-chilled 10° C. water and placed into a 10° C. growth chamber for 7 days. After 7 days, water was drained and samples were rolled into germination paper. Rolls were placed upright into plastic buckets and placed in a chamber at 25° C. for 3 days. After 3 days, germination rolls were unwrapped and seedlings were scored for normal seedling using AOSA criteria for seed testing.

For inbreds, the Cold Soak Test protocol is as follows: Seeds were counted into 3-4 replicates of 50 kernels and were placed on germination paper moistened with water. Seeds were then covered with another layer of moist germination paper and rolled to a diameter of about 4-6 cm, and then wrapped in wax paper. The assembly of rolled germination and wax paper with the seed inside was then completely submerged in a water bath at 10° C. for about 10 minutes. The rolls were then placed in a chamber at 25° C. for 3 days, after which the seedlings were scored for normal seedling using AOSA criteria for seed testing.

Warm Germination: Control or ultra-dried seed from eight hybrids were tested in a warm germination test in spring 2011 within one h of removal from drying. Seeds were planted in 4 replications of 50 kernels onto moist germination paper which was covered with another layer of moist germination paper, rolled, wrapped in wax paper and placed upright into a plastic bucket. Samples were placed in a germination chamber (Percival model) at 25° C. for 4 days, after which, seedlings are scored for number normal seedlings using AOSA criteria for seed testing.

Field Emergence: Field emergence studies were conducted at Pioneer research locations in North America in spring 2011. Locations and planting dates were as follows: Eau Claire, Wis. (April 12), Minburn, Iowa (April 13), Schuyler, Nebr. (April 25), Grand Forks, N. Dak. (May 18), and Coteau du Lac, Canada (April 25). Three replications of 30 kernels of control and ultra-dried seed were planted in single 5.2 m rows following a randomized block design. Soil temperature probes were planted at approximately 8 cm depth in each location. Emerged plants were counted at the seedling stage (i.e. V2-V4 stage). Locations were characterized as stressful or non-stressful based on soil temperatures after planting and % emergence at a location level.

Pioneer Stress Test: The purpose of the Pioneer Stress Test is to determine the number of seeds that will germinate and produce normal seedlings under stressed conditions. The Pioneer Stress Test is described in the following paragraphs.

Materials:
Germination towels—2 sheets (9×22 inch-38 pound) Soak paper in water until saturated. Drain thoroughly to remove excess moisture.
Recommended 13 towels (rolls) per rack based on rack size approx. 36.8 cm wide
Planting board—50 seed count offset holes
Wax coated paper or equivalent for moisture control
Chamber Conditions:
Soak Chamber—Water temperature 4 degrees C. (plus or minus 1 degree Celsius).
Recommended carbon filtered tap water if not suitable for human consumption.
Recommended that water be changed every 2 tests, not to exceed 3 test runs.
Germination Chamber—25 degrees C. (plus or minus 2 degrees Celsius)
Test Duration:
Planting period: All samples must be submerged within 1 hour of removing seed from cold storage. Soak Period: 72 hours+/−2 hours
Warm germination period: 96 hours+/−4 hours
Sample Preparation:
Test is conducted on treated or untreated seed.
Pieces of broken and damaged seeds, including those that are insect damaged, which are half their original size or less are considered inert matter and are not planted in the germination test.
All samples (including check samples but excluding sample sizing samples) should be chilled to 10 degrees C. prior to planting. However, it is recommended that all samples (including sample sizing samples) be stored at 10 degrees C. until tested.

Protocol:
1. Place 200 seeds on wet towel.
2. Place one sheet of wet paper over the seeds.
3. Place identification label either on top of towels or on wax paper ensuring that a label accompanies each roll.
4. Roll towels to form a cylinder just tightly enough to prevent seed loss from rolled towels during the test.
5. Roll again in one sheet of wax paper, coated side in.
6. Place rolls vertically in racks.
7. When planting is complete place racks in soak chamber for 72 h (plus or minus 2 hours) at 4 degrees Celsius (plus or minus 1 degree C.).
8. At the end of the soak period, remove racks from soak chamber and allow excess water to drain
9. Place racks in 25 degrees Celsius (plus or minus 2 degrees C.) chamber for 96 plus or minus 4 hours.
10. Remove samples from chamber and record the number of abnormal and dead seedlings.

Ultra-Drying Procedure: approximately 355 g seed sample was placed inside a seed storage envelope (178 mm×292 mm) which was then placed in a circulating-air dryer at 42° C. Samples were weighed periodically to determine moisture loss.

Seeds were subjected to the Cold Soak germination test within one hour of reaching approx. 6% moisture on fresh weight basis.

Example 2

Pioneer Stress Test (PST) and Third-Party Cold Test for Assessment of Commercial Seed Quality Seed from five hybrid samples was tested in the Pioneer Stress Test (PST) and also submitted to four commercial seed testing laboratories to undergo cold testing to determine if commercial laboratories using the Cold Test were as stringent as the Pioneer Stress Test in identifying seed samples that would not perform well or marginal under stressful conditions. The five samples submitted, including one that had low quality which was intended as a check (FIG. 1, Sample A), were all average or marginal compared to the Pioneer Stress Test (FIG. 1).

The Pioneer Stress Test had lower germination values than the third-party Cold Tests for the same samples, indicating that the test imposed a higher stress level on the seed. Results of the third party labs generally were consistently high and did not appear to differentiate the samples. The Pioneer Stress Test results generally correlate well with field emergence in stressful conditions including extended cold, wet soils and high residue. In addition, none of the laboratories identified the low quality check sample submitted. In contrast, the low quality check was identified in the Pioneer Stress Test (FIG. 1, sample A). This further supports that the Pioneer Stress Test is significantly more stressful and predictive of field emergence under stressful conditions than the cold test used by commercial laboratories.

There are no standards or official protocols for the Cold Test. As such, third party labs may set their own protocols for running and interpreting their tests.

Example 3

Using the Pioneer Stress Test for Evaluating the Effect of Transgenic Events on Seed Germination Seeds of crop plants such as corn and soybeans are commonly modified through transgenic events. These events are intended to modify characteristics of the seed or plants such as tolerance to herbicides, resistance to insects, low nitrogen utilization, cold or drought tolerance. Other transgenic events are intended to modify seed composition for food, feed or industrial uses. The insertion of transgenic events into seed can have negative or positive effects on seed germination. As such, there is a need for predictive germination tests to identify transgenic events that can be used to improve germination under stressful field conditions, as well as ones that are likely to have negative effects on germination and crop establishment.

The Pioneer Stress Test was used to evaluate the effect of two transgenic events (Event 1 and Event 2, see Table 1), derived from the same construct, on the germination of 17 unique corn inbred lines. Table 1 shows the percent germination of seeds transformed with either of the two events compared to the non-transgenic (null) line. These results demonstrated that inbred lines containing either of the two transgenic events had lower overall % germination than the non-transgenic lines.

TABLE 1

Percentage of Germination of Seeds Transformed with Either of Two Events Compared Non-Transgenic Null

| Inbred | Null | Event 1 | Event 2 |
|---|---|---|---|
| A | 59 | 47 | 48 |
| B | 84 | 76 | 85 |
| C | 55 | 39 | 56 |
| D | 90 | 71 | 68 |
| E | 76 | 77 | 67 |
| F | 63 | 46 | 47 |
| G | 76 | 55 | 50 |
| H | 95 | 77 | 86 |
| I | 87 | 78 | 76 |
| J | 86 | 77 | 80 |
| K | 72 | 69 | 70 |
| L | 90 | 66 | 90 |
| M | 75 | 76 | 70 |
| N | 86 | 75 | 83 |
| O | 76 | 45 | 72 |
| P | 94 | 91 | 94 |
| Q | 81 | 82 | 70 |
| Mean | 79 | 67 | 71 |

Example 4

Comparison of Cold Soak and Cold Germination Tests for Differentiating Hybrid Response to Ultra-Drying Cold germination testing (commonly referred to as cold testing) has been used extensively for assessment of the ability of seeds to germinate under field conditions. Although there are no standardized protocols for cold testing, protocols are commonly based on exposing the seed to low temperature stress, usually 10° C., using various substrates followed by a period of recovery at 25° C. (Association of Official Seed Analysts, 2002, Seed Vigor Testing Handbook, AOSA, Stillwater, Okla.). As such, cold tests are intended to be more predictive of field emergence than the standard warm tests (also referred to as the germination test), which aims to assess the maximum germination potential under non-stress conditions (IASTA, 2010). However, recent observations have indicated that general cold test conditions do not provide sufficient differentiation among hybrids or breeding populations to allow for additional germplasm selection and improvement under the increased stress levels associated with recent farming trends. As such, a more stressful test is needed to provide differentiation as well as prediction of field emergence in stressful environments.

In this disclosure, a cold soaking method was developed which exposes the seed to the additional stress of cold water imbibition as well as the stress of flooding and associated oxygen deprivation. These conditions are often encountered in field environments where the seed is exposed to cold, saturated conditions as a result of early spring storms.

FIG. 2 shows the germination results for three hybrids that were ultra-dried to 6% or maintained at control moisture content in the cold test (FIG. 2-A) and Cold Soak Test (FIG. 2-B). In the cold test, germination values averages 94% for the controls. After ultra-drying, two of the three hybrids had very small reductions in germination values compared to the controls while the third hybrid (FIG. 2-A) showed 18% reduction in germination (94% vs. 77%). In the Cold Soak Test (FIG. 2-B), germination values averaged 74% for the controls and declined significantly for all hybrids after ultra-drying. The magnitude of germination reduction due to ultra-drying ranged from 18% (36Y26) to 76% (35F40PDR) and 87% (35F40PDR).

Example 5

Corn Inbred Cold Soak Test and Emergence Response

Example 4 discussed germination results for corn hybrids that were ultra dried to 6% or maintained at control moisture content in the cold test and Cold Soak Test. Corn inbreds were also used in the Cold Soak Test using slightly differing conditions.

Seeds from 16 unique Pioneer commercial inbreds were planted in spring 2011 in a field near Montreal, Canada. Three replicates of 30 kernels from each inbred sample were planted in 5.2 m rows at approximately 5 cm depth. The number of emerged seedlings were counted at V2-V4. Seeds from the same inbred samples were also subjected to the inbred Cold Soak Test.

Figure 8:
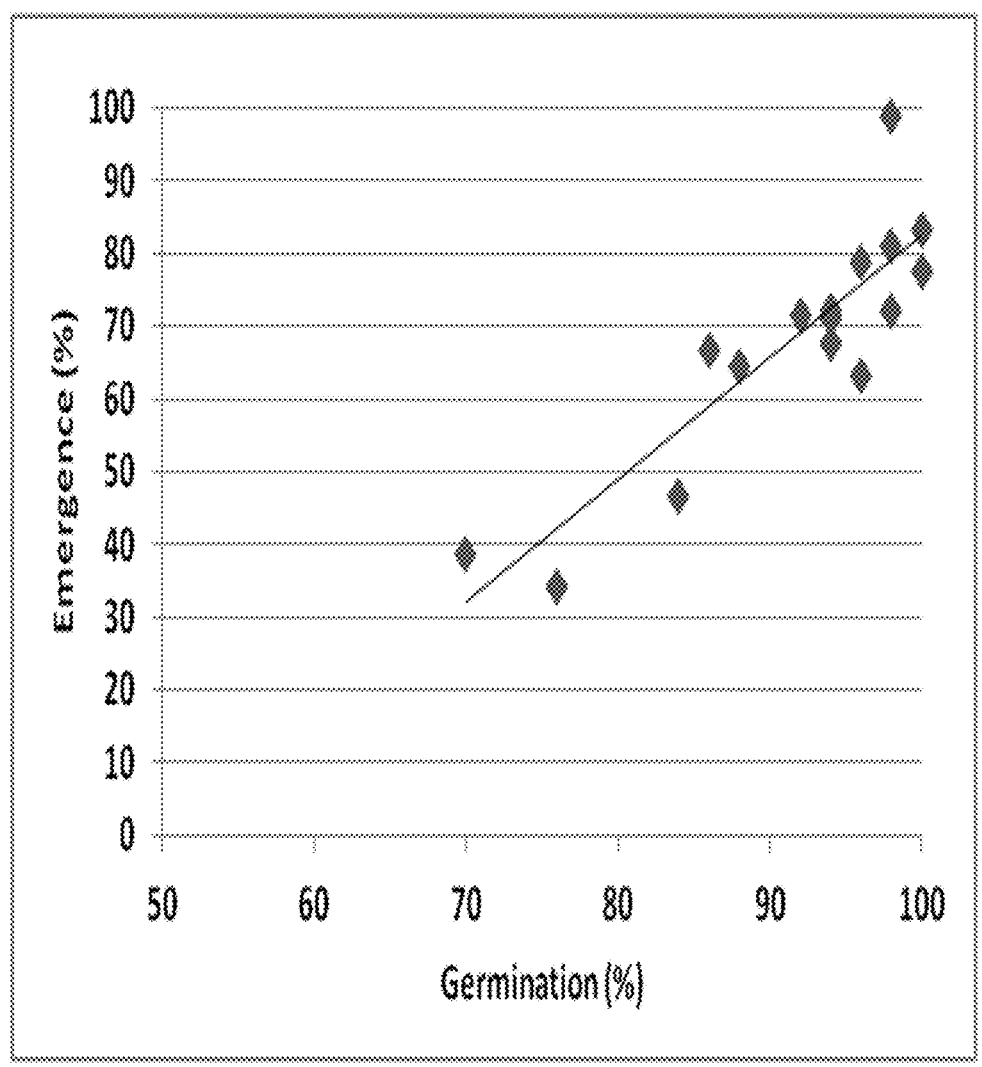
FIG. 8 shows a scatter plot of % field emergence (y axis) and % germination (x axis) in the inbred Cold Soak Test.

FIG. 8 shows a scatter plot of % field emergence and % germination in the inbred Cold Soak Test. The inbred Cold Soak Test provided broad separation among the inbreds with germination values ranging from 70 to 100%. Also, the results show that the Cold Soak Test provided good prediction of field emergence for the inbreds in the test with a correlation of 0.88.

Example 6

Figure 3:
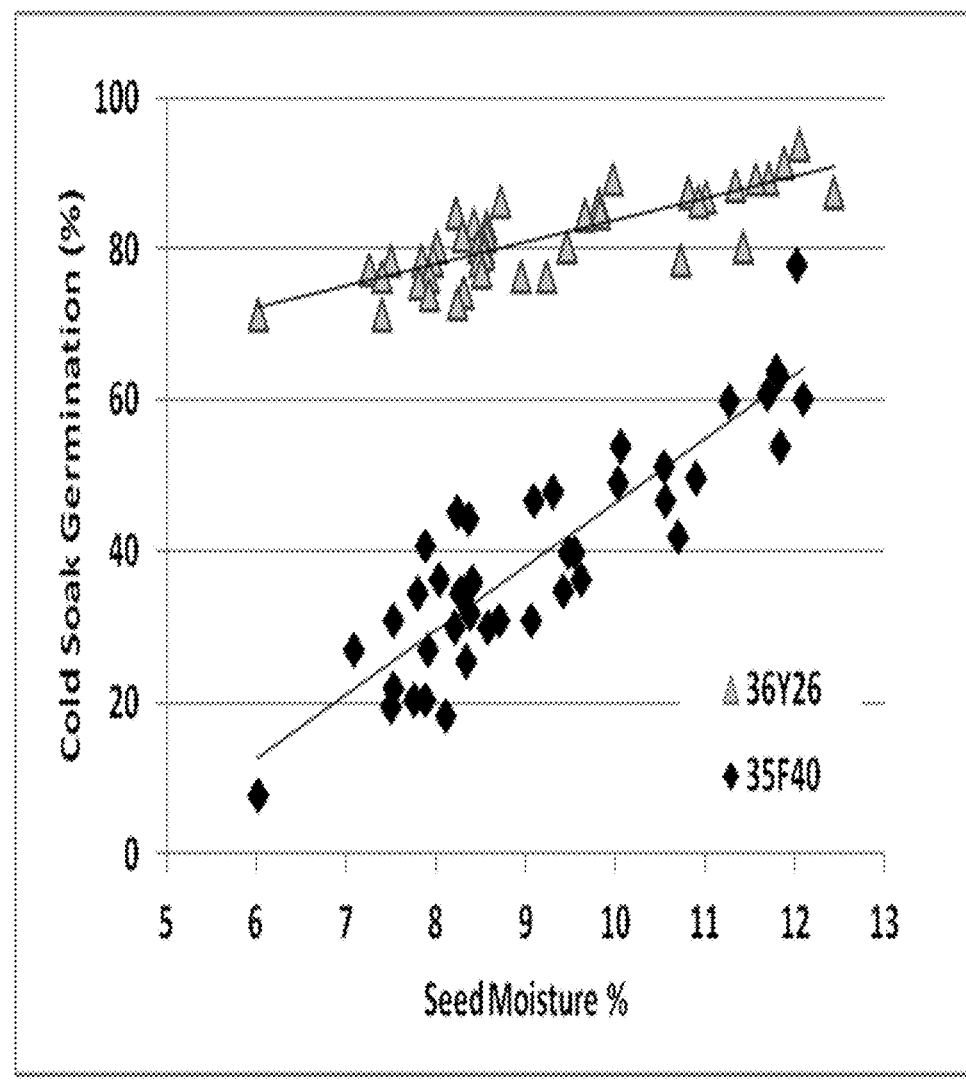
FIG. 3 shows the contrasting germination response of two corn hybrids in the Cold Soak Test at various seed moisture contents ranging from approximately 12% to 6%.

Contrasting Cold Soak Germination Response to Drying to Various Seed Moistures and Recovery from Ultra-drying Two hybrids, 36Y26 (hybrid A) and 35F40 (hybrid B), were evaluated in the Cold Soak Test at various stages during drying from approx. 12% to 6% seed moisture (FIG. 3). The hybrids exhibited different germination responses as the seed moisture was reduced, with the greatest response magnitude observed at the lowest seed moisture (6%). Hybrid A showed a relatively flat germination response to drying from 12 to 6% seed moisture (21% reduction). In contrast, hybrid B showed a steeper response to drying and a greater reduction in germination (87% reduction) at 6% compared to 12%. These results indicate that drying seed below optimal 12% moisture results in increased emergence sensitivity under stress, with the greatest sensitivity attained at 6% seed moisture. Results also indicate that progressive drying provides increased differentiation between hybrids with the maximum differentiation observed at 6% seed moisture, and suggest that ultra-drying can be used to maximize differentiation among hybrids for the ability to germinate and emerge under stress.

Example 7

Recovery of Cold Soak Germination after Ultra-drying

Under optimal cold storage conditions, both hybrids show an increase in Cold Soak germination in parallel to moisture recovery (FIG. 4). In FIG. 4-B, hybrid 35F40 shows an over 5-fold increase in Cold Soak germination after recovery along with a seed moisture increase from 6 to nearly 10%. In contrast, in FIG. 4-A, hybrid 36Y26 showed only a 38% increase in Cold Soak germination along with a similar increase in seed moisture. This data provides further evidence that ultra-drying reduces seed germination in a hybrid-dependent manner, as measured in a stressful test such as the Cold Soak Test, and that partial recovery is attained as seed moisture content increases.

Example 8

Effect of Ultra-drying on Germination in the Warm Germination Test and the Cold Soak Test The warm germination test, commonly referred to as The Germination Test, is a standard test intended to predict the maximum germination potential of a sample and estimate the field planting value (presumably under optimal conditions, International Rules for Seed Testing, ISTA 2009). Results of the warm germination test are commonly reported on seed analysis certificates (International Rules for Seed Testing, ISTA 2009). The warm germination test is usually the only indicator of seed germination reported on tags of commercial seed corn sold to growers in the United States.

In this study, the warm germination test was intended to evaluate whether ultra-drying resulted in damage to seed viability rather than increased sensitivity to germination under stressful laboratory or field conditions. FIG. 5-A shows results of the warm germination test for ultra-dried and control seed from four commercial hybrids. Ultra-dried samples averaged 94% in the warm germination test compared to 95% for the un-dried controls. These results indicate that the ultra-drying treatment did not affect the viability of the seed.

Seeds from the same ultra-dried and control samples were also subjected to the Cold Soak Test (FIG. 5-B). Ultra-dried samples averaged 58% germination in this test compared to 81% for the un-dried controls. The ultra-drying treatment resulted in differential germination responses among the hybrids in the Cold Soak Test. For example, hybrid 38B14 showed a 67% reduction in emergence as a result of ultra-drying, while hybrid P9512XR only showed a 14% reduction in emergence in the same test.

Example 9

Effect of Ultra-drying on Field Emergence in Non-stress Locations in Spring 2011

Figure 6:
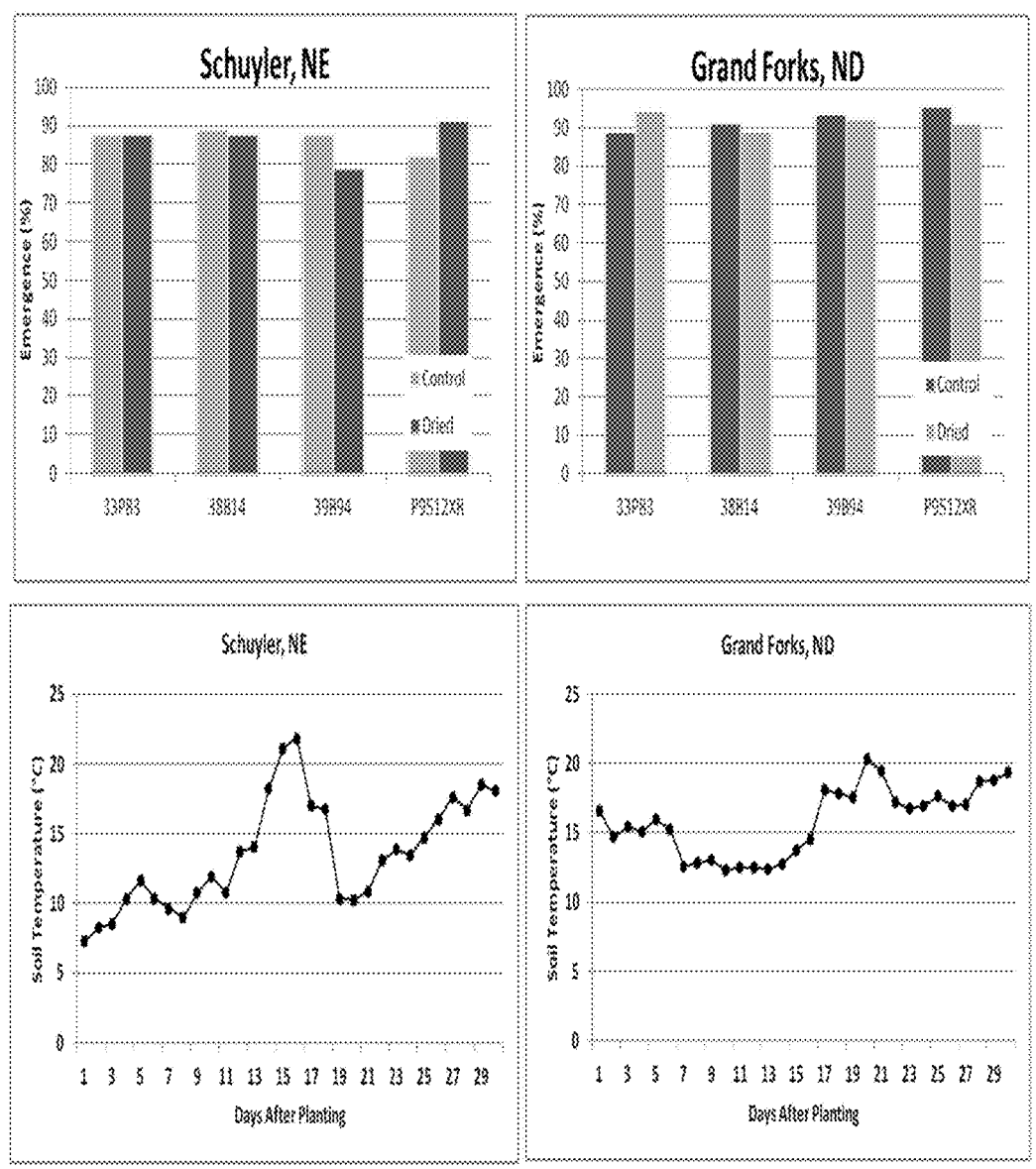
FIG. 6 shows in the top two panels field emergence of dried and control corn hybrids in two non-stress locations in 2011. The bottom panels show the daily average soil temperatures at approximately 8 cm soil depth for each corresponding location.

Seeds from the same ultra-dried and control samples in the warm germination test (FIG. 5-A) were also planted in a multi-location field trial in the spring 2011. Two locations, Schuyler, Nebr. and Grand Forks, N. Dak. had overall field emergence of >85% and as such, were considered as non-stress locations. FIG. 6 shows the effect of ultra-drying on % field emergence in Schuyler, Nebr. and Grand Forks, N. Dak.

In the Schuyler location, the ultra-dried hybrids had 87% overall emergence compared to 86% for the controls at the same location. In the Grand Forks location, the ultra-dried hybrids had 92% overall emergence compared to 91% for the controls. Soil temperatures averaged 12° C. for the two week period after planting at Schuyler and 14° C. at Grand Forks. These results confirmed that the ultra-drying treatment did not impact field emergence under non-stressful conditions, which supports results of the warm germination test. Moreover, the results demonstrate that differentiation among hybrids for field emergence, even after ultra-drying, was not possible in non-stress conditions. This also supports the need to perform field evaluations in stressful conditions, which is an elusive target due to unpredictable weather patterns in spring and the likelihood of excessive wet conditions that can preclude early planting that is typically necessary for cold stress conditions during seed germination and crop emergence. As such, the results also support the need for stressful and predictive laboratory germination tests.

Example 10

Effect of Ultra-drying on Field Emergence in Stressful Locations in Spring 2011

Figure 7:
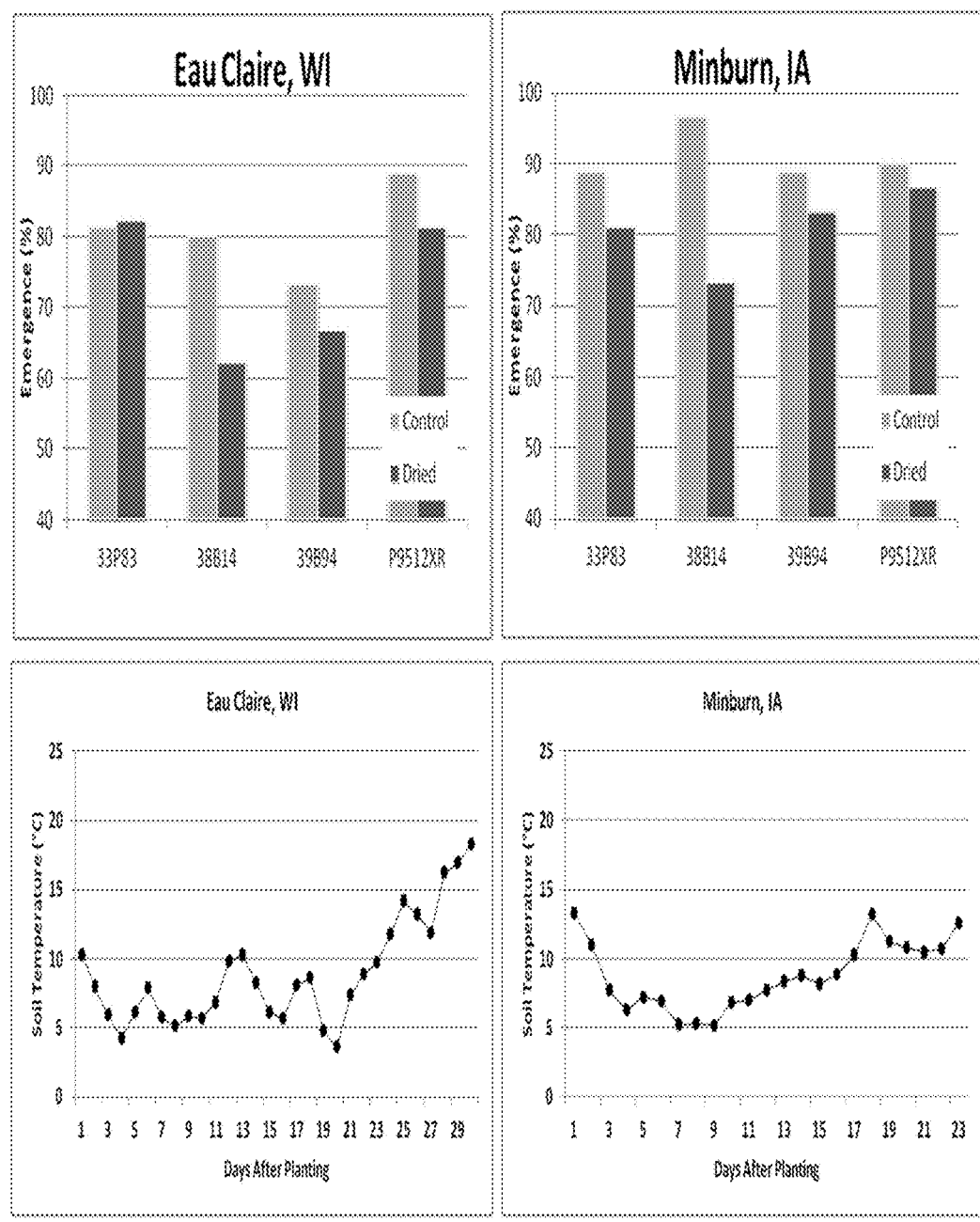
FIG. 7 shows in the top two panels field emergence of ultra-dried and control samples of four corn hybrids in two locations with early-season stress in 2011. The bottom panels show daily average soil temperatures at approximately 8 cm soil depth for each corresponding location.

Seeds from the same ultra-dried and control samples in the warm germination and Cold Soak Tests (Example 8), as well as the non-stress field locations (Example 9), were also planted in two stressful locations in 2011 (FIG. 7). In the Eau Claire location, the ultra-dried hybrids had 73% overall emergence compared to 81% for the controls at the same location. In the Minburn location, the ultra-dried hybrids had 81% overall emergence compared to 91% for the controls. Soil temperatures averaged 7° C. at Eau Claire and 8° C. at Grand Forks for the two week period after planting.

The ultra-drying treatment resulted in differential emergence responses among the hybrids under stress. For example, hybrid 38B14 showed a 23% reduction in emergence in Eau Claire as a result of ultra-drying, while hybrid P9512XR only showed a 9% reduction in emergence in the same location. Similar differential responses among hybrids to ultra-drying were also observed in the Minburn location. The overall reduction in field emergence under stress as a result of ultra-drying, and the differential hybrid responses observed, were very similar to the results obtained for the same hybrids in the Cold Soak Test (FIG. 5-B).

While the foregoing has been described in some detail for purposes of clarity and understanding, it will be clear to one skilled in the art from a reading of this disclosure that various changes in form and detail can be made without departing from the true scope. For example, all the techniques, methods, compositions, apparatus and systems described above may be used in various combinations. All publications, patents, patent applications, or other documents cited in this application are incorporated by reference in their entirety for all purposes to the same extent as if each individual publication, patent, patent application, or other document were individually indicated to be incorporated by reference for all purposes.

What is claimed is:
1. A method of comparative testing at least two seeds having different genotypes, comprising:
  (a) separately submerging the seeds having different genotypes in an aqueous solution for a duration of between 70 and 74 hours, wherein temperature of the aqueous solution is between 3 degrees Celsius and 5 degrees Celsius and wherein the seeds having different genotypes have initial moisture contents of 6% to 12%;
  (b) germinating the seeds having different genotypes at a temperature of between 23 and 27 degrees Celsius for a period of between 92 and 100 hours;
  (c) evaluating germination results of the seeds having different genotypes, and
  (d) scoring emerged seedlings of each of the at least two seeds having different genotypes according to normal seedling AOSA criteria;
  wherein the at least two seeds having different genotypes is maize (*Zea mays*) seed.

2. The method of claim 1, wherein the submersion comprises submerging 10% to 100% of a surface of said seed in the aqueous solution.

3. The method of claim 1, wherein the submersion comprises submerging about 100% of a surface of said seed in the aqueous solution.

4. The method of claim 1, wherein the aqueous solution is water.

5. The method of claim 1, wherein the aqueous solution for the submersion comprises addition of antibiotics, antifungi components, electrolytes, preservatives, EDTA, salts, nutrients, and/or growth regulators.

6. The method of claim 1, wherein the seed is dried prior to the submergence.

7. The method of claim 6, wherein the seed is dried in an oven.

8. The method of claim 6, wherein the seed is dried using salt solutions, dry salts, or chemical desiccants.

9. The method of claim 6, wherein the seed is dried at 22 degrees Celsius or above.

10. The method of claim 1, wherein the seed is evaluated in a controlled environment.

11. The method of claim 1, wherein the seed is evaluated in a field.

12. The method of claim 1, wherein the seed is evaluated in laboratory or greenhouse conditions.

13. The method of claim 1, wherein the seed is an inbred seed.

14. The method of claim 1, wherein the seed is a hybrid seed.

15. The method of claim 1, wherein the seed is planted in early spring.

16. The method of claim 1, wherein the seed contains a recombinant DNA construct.

17. A method for identifying performance of one or more transgenic traits, comprising screening seed containing said one or more transgenic traits with the method of claim 1, wherein heritable variation is linked to a seed sample carrying at least one transgenic trait.

\* \* \* \* \*